US012591562B1

(12) United States Patent
Zhang et al.

(10) Patent No.: US 12,591,562 B1
(45) Date of Patent: Mar. 31, 2026

(54) SYSTEMS AND METHODS FOR AN INDEXING TREE BASED ARTIFICIAL INTELLIGENCE CONVERSATION AGENT

(71) Applicant: Salesforce, Inc., San Francisco, CA (US)

(72) Inventors: Nan Zhang, Palo Alto, CA (US); Prafulla Kumar Choubey, San Jose, CA (US); Alexander R. Fabbri, New York, NY (US); Gabriel Bernadett-Shapiro, Palo Alto, CA (US); Chien-Sheng Wu, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 19/041,855

(22) Filed: Jan. 30, 2025

Related U.S. Application Data

(60) Provisional application No. 63/701,864, filed on Oct. 1, 2024.

(51) Int. Cl.
| | |
|---|---|
| *G06F 16/00* | (2019.01) |
| *G06F 16/22* | (2019.01) |
| *G06F 40/35* | (2020.01) |
| *G06N 3/0475* | (2023.01) |
| *G06F 40/284* | (2020.01) |

(52) U.S. Cl.
CPC .......... *G06F 16/2246* (2019.01); *G06F 40/35* (2020.01); *G06N 3/0475* (2023.01); *G06F 40/284* (2020.01)

(58) Field of Classification Search
None
See application file for complete search history.

(56) References Cited

U.S. PATENT DOCUMENTS

| | | | | |
|---|---|---|---|---|
| 12,282,504 B1 * | 4/2025 | Ganesh | ............... | G06F 16/3347 |
| 2025/0371386 A1 * | 12/2025 | AlShikh | ................. | G06F 40/30 |

OTHER PUBLICATIONS

Author: Parth Sarthi, Salman Abdullah, Aditi Tuli, Shubh Khanna, Anna Goldie, Christopher D. Manning; Title: RAPTOR: Recursive Abstractive Processing for Tree-Organized Retrieval; Publisher: Stanford University; Pertinent Pages: All pages as attached. (Year: 2024).*

* cited by examiner

*Primary Examiner* — Anhtai V Tran
(74) *Attorney, Agent, or Firm* — Haynes and Boone, LLP

(57) ABSTRACT

A method of retrieval-augmented text generation is provided to generate a response to by an artificial intelligence (AI) agent. The method incudes constructing an indexing tree reflecting sematic relationship among textual contexts of one or more documents. The indexing tree includes at least a first level of nodes representing a plurality of propositions indicating facts about at least one entity from the documents, a second level of nodes representing a plurality of proposition aggregates that aggregate one or more first-level propositions mentioning a same entity, and a third level of nodes representing a plurality of summaries that summarize one or more second-level proposition aggregates. The method also includes receiving the user query; retrieving, from the indexing tree, one or more nodes across multiple levels based on similarity comparison with the user query based at least on a similarity between embeddings of the nodes and an embedding of the user query.

20 Claims, 16 Drawing Sheets

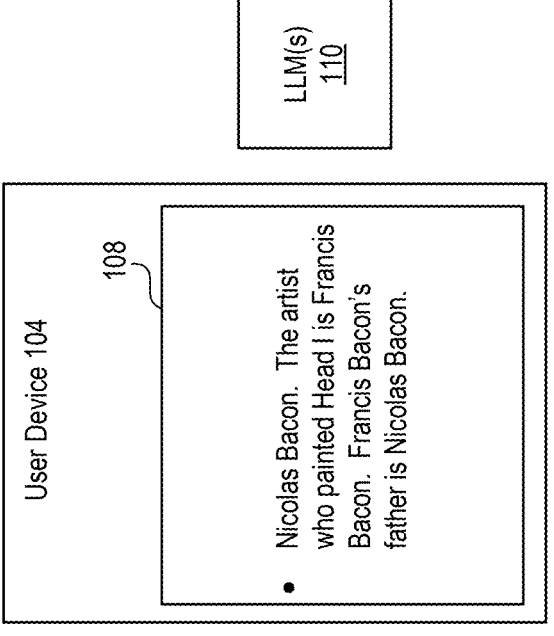
User Device 104
108
- Nicolas Bacon. The artist who painted Head I is Francis Bacon. Francis Bacon's father is Nicolas Bacon.
LLM(s) 110
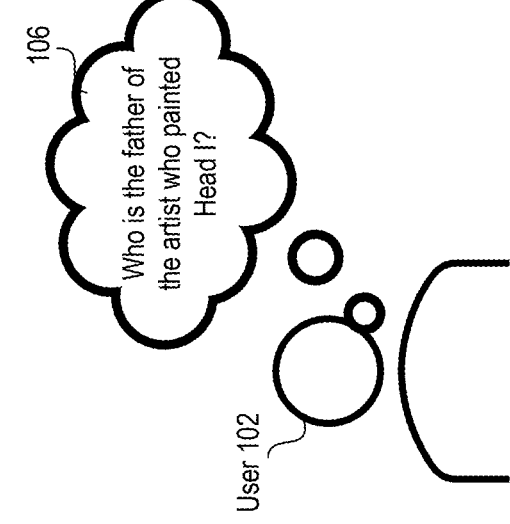
106
Who is the father of the artist who painted Head I?
User 102
100
FIG. 1

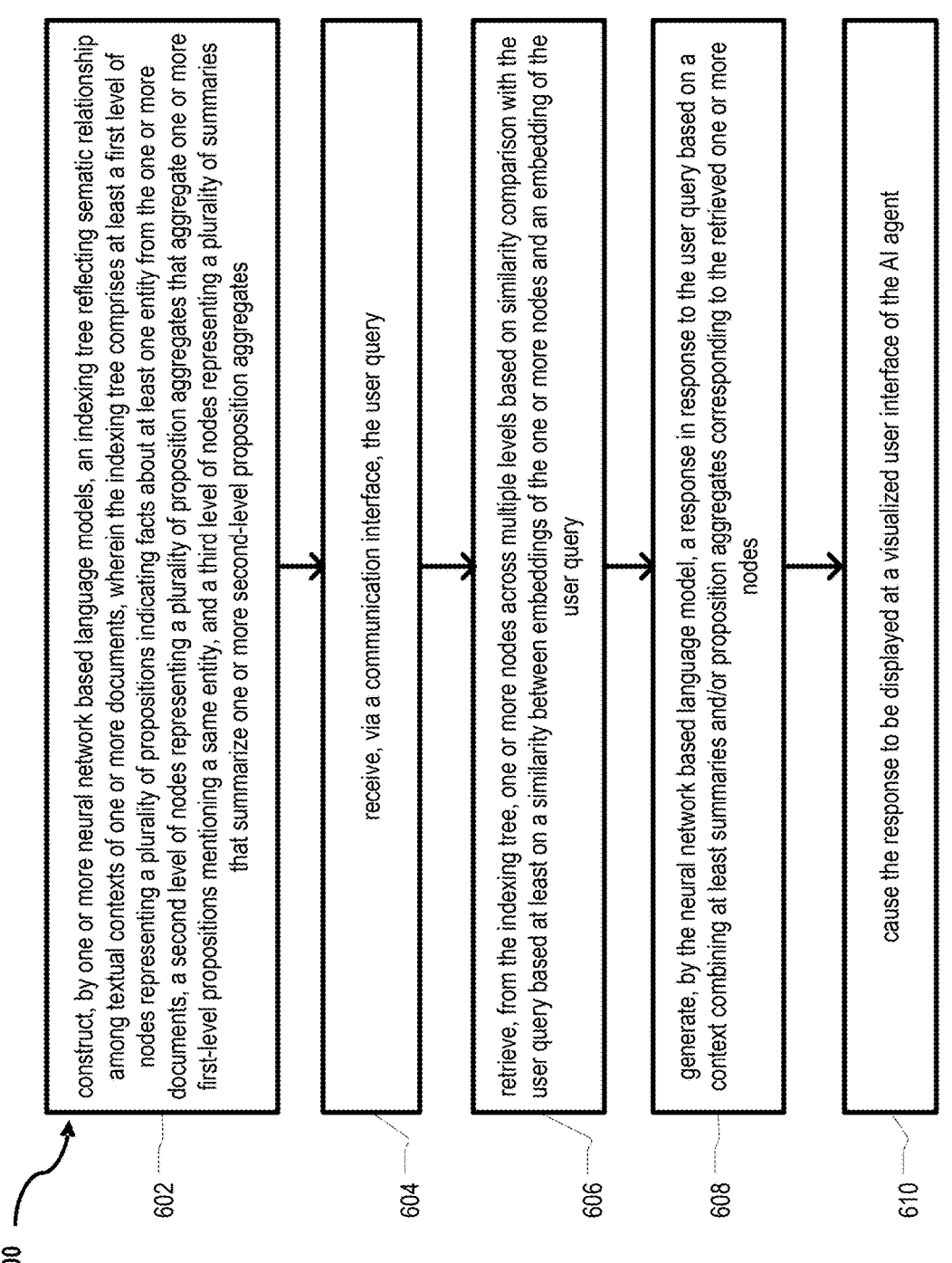

construct, by one or more neural network based language models, an indexing tree reflecting sematic relationship among textual contexts of one or more documents, wherein the indexing tree comprises at least a first level of nodes representing a plurality of propositions indicating facts about at least one entity from the one or more documents, a second level of nodes representing a plurality of proposition aggregates that aggregate one or more first-level propositions mentioning a same entity, and a third level of nodes representing a plurality of summaries that summarize one or more second-level proposition aggregates

602 receive, via a communication interface, the user query

604 retrieve, from the indexing tree, one or more nodes across multiple levels based on similarity comparison with the user query based at least on a similarity between embeddings of the one or more nodes and an embedding of the user query

606 generate, by the neural network based language model, a response in response to the user query based on a context combining at least summaries and/or proposition aggregates corresponding to the retrieved one or more nodes

608 cause the response to be displayed at a visualized user interface of the AI agent

| | Average Accuracy | Standard Deviation |
|---|---|---|
| RAPTOR | 78.88 | 0.005 |
| Hierarchical Text Chunks | 78.76 | 0.004 |

FIG.7A

| Dataset | #Chunks | #Props. | #Ents | #Props Aggs. | #Props per Entity | | |
|---|---|---|---|---|---|---|---|
| | | | | | Avg. | Max. | Min. |
| MuSiQue | 11,656 | 54,605 | 50,926 | 20,788 | 2.74 | 168 | 1 |
| 2Wiki | 6,119 | 27,697 | 29,490 | 11,108 | 2.49 | 195 | 1 |
| HotpotQA | 9,221 | 47,153 | 46,856 | 18,278 | 2.66 | 165 | 1 |

(≡)

(≡)

*Proposition 1:* Drug sales are reaching record highs as new therapies are developed and approved.
*Entities:* []
*Proposition 2:* Drug sales for Eli Lilly's Mounjaro and Novo Nordisk's semaglutide are reaching record highs as new therapies are developed and approved.
*Entities:* [Eli Lilly, Mounjaro, Novo Nordisk, Semaglutide]

FIG.7B

| Model | MuSiQue | | 2Wiki | | HotpotQA | | Average | |
|---|---|---|---|---|---|---|---|---|
| | EM | F1 | EM | F1 | EM | F1 | EM | F1 |
| HippoRAG (GPT-3.5-Turbo) | 32.60 | 43.78 | 66.40 | 74.01 | 59.90 | 74.29 | 52.97 | 64.03 |
| RAPTOR (GPT-3.5-Turbo) | 35.30 | 47.47 | 54.90 | 61.20 | 58.10 | 72.48 | 49.43 | 60.38 |
| GraphRAG (GPT-4o) | 12.10 | 20.22 | 22.50 | 27.49 | 31.70 | 42.74 | 22.10 | 30.15 |
| RAPTOR (GPT-4o) | 36.40 | 49.09 | 53.80 | 61.45 | 58.00 | 73.08 | 49.40 | 61.21 |
| SiReRAG (GPT-3.5-Turbo) | 38.90 | 52.08 | 60.40 | 68.20 | 62.50 | 77.36 | 53.93 | 65.88 |
| SiReRAG (GPT-4o) | 40.50 | 53.08 | 59.60 | 67.94 | 61.70 | 76.48 | 53.93 | 65.83 |

FIG.7C

| Variants | MuSiQue | | 2Wiki | | HotpotQA | | Average | |
|---|---|---|---|---|---|---|---|---|
| | EM | F1 | EM | F1 | EM | F1 | EM | F1 |
| SIReRAG | 40.50 | 53.08 | 59.00 | 67.94 | 61.70 | 76.48 | 53.93 | 65.83 |
| (A): SIReRAG – Re. Summary | 37.50 | 50.38 | 57.70 | 65.75 | 61.20 | 75.99 | 52.13 | 64.04 |
| (B): SIReRAG + Proposition | 39.10 | 51.80 | 58.10 | 65.53 | 60.80 | 75.26 | 52.67 | 64.20 |
| (C): (B) – Aggregate | 34.70 | 47.82 | 53.20 | 60.22 | 58.90 | 73.38 | 48.93 | 60.47 |
| (D): (C) – Re. Summary | 33.90 | 46.19 | 53.00 | 59.13 | 57.00 | 71.09 | 47.97 | 58.80 |
| (E): Dual Clustering on Chunks | 34.80 | 47.32 | 53.50 | 59.93 | 56.60 | 71.84 | 48.30 | 59.70 |

FIG.7D

| Variants | MuSiQue | | 2Wiki | | HotpotQA | | Average | |
|---|---|---|---|---|---|---|---|---|
| | EM | F1 | EM | F1 | EM | F1 | EM | F1 |
| BM25 | 25.90 | 35.88 | 53.00 | 58.58 | 57.70 | 71.32 | 45.53 | 55.26 |
| RAPTOR + BM25 | 27.00 | 38.91 | 50.60 | 57.00 | 56.90 | 70.88 | 44.83 | 55.60 |
| SIRERAG + BM25 | 35.00 | 47.66 | 58.20 | 65.72 | 61.70 | 75.88 | 51.63 | 63.09 |
| ColBERTv2 | 34.00 | 46.80 | 52.90 | 59.48 | 59.00 | 73.42 | 48.63 | 59.90 |
| RAPTOR + ColBERTv2 | 34.20 | 47.17 | 50.30 | 57.51 | 57.90 | 72.31 | 47.47 | 59.08 |
| SIRERAG + ColBERTv2 | 38.10 | 51.32 | 56.70 | 64.74 | 60.90 | 75.72 | 51.90 | 63.93 |

FIG.7E

| Model | MuSiQue | | 2Wiki | | HotpotQA | | Average | |
|---|---|---|---|---|---|---|---|---|
| | TPQ↓ | TPER↓ | TPQ↓ | TPER↓ | TPQ↓ | TPER↓ | TPQ↓ | TPER↓ |
| RAPTOR | 1.560 | - | 1.437 | - | 1.502 | - | 1.500 | - |
| SiReRAG | 2.653 | 0.600 | 1.974 | 0.499 | 2.319 | 0.517 | 2.315 | 0.539 |

FIG. 7F

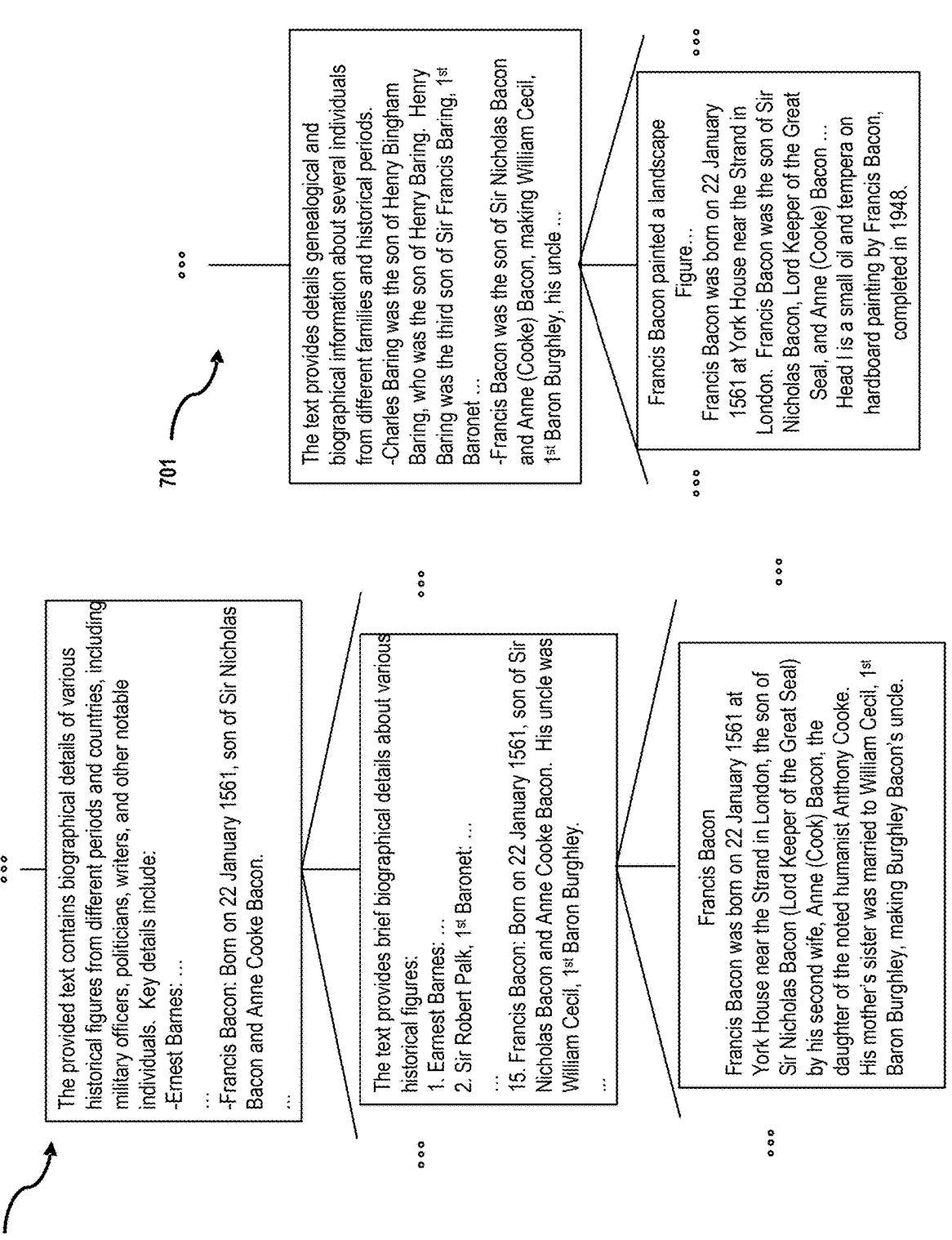

700

701

The provided text contains biographical details of various historical figures from different periods and countries, including military officers, politicians, writers, and other notable individuals. Key details include:

-Ernest Barnes: ...

...

-Francis Bacon: Born on 22 January 1561, son of Sir Nicholas Bacon and Anne Cooke Bacon.

...

The text provides brief biographical details about various historical figures:

1. Earnest Barnes: ...
2. Sir Robert Palk, 1ˢᵗ Baronet: ...

...

15. Francis Bacon: Born on 22 January 1561, son of Sir Nicholas Bacon and Anne Cooke Bacon. His uncle was William Cecil, 1ˢᵗ Baron Burghley.

...

Francis Bacon

Francis Bacon was born on 22 January 1561 at York House near the Strand in London, the son of Sir Nicholas Bacon (Lord Keeper of the Great Seal) by his second wife, Anne (Cook) Bacon, the daughter of the noted humanist Anthony Cooke. His mother's sister was married to William Cecil, 1ˢᵗ Baron Burghley, making Burghley Bacon's uncle.

The text provides details genealogical and biographical information about several individuals from different families and historical periods.

-Charles Baring was the son of Henry Bingham Baring, who was the son of Henry Baring. Henry Baring was the third son of Sir Francis Baring, 1ˢᵗ Baronet ...

...

-Francis Bacon was the son of Sir Nicholas Bacon and Anne (Cooke) Bacon, making William Cecil, 1ˢᵗ Baron Burghley, his uncle ...

Francis Bacon painted a landscape Figure....

Francis Bacon was born on 22 January 1561 at York House near the Strand in London. Francis Bacon was the son of Sir Nicholas Bacon, Lord Keeper of the Great Seal, and Anne (Cooke) Bacon ...

Head I is a small oil and tempera on hardboard painting by Francis Bacon, completed in 1948.

FIG.7G

SYSTEMS AND METHODS FOR AN INDEXING TREE BASED ARTIFICIAL INTELLIGENCE CONVERSATION AGENT

CROSS REFERENCE(S)

The instant application is a nonprovisional of and claim priority under 35 U.S.C. 119 to U.S. provisional application No. 63/701,864, filed Oct. 1, 2024, which is hereby expressly incorporated by reference herein in its entirety.

TECHNICAL FIELD

The embodiments relate generally to machine learning systems for an artificial intelligent (AI) conversation agent, and more specifically to systems and methods for an indexing tree based AI conversation agent.

BACKGROUND

AI agents, commonly known as AI agents or virtual assistants, can be applied to a wide range of practical applications across various industries. In customer service, AI agents can handle user inquiries, provide support, and resolve issues 24/7, improving customer satisfaction and reducing operational costs. In healthcare, AI agents can offer initial consultations, answer health-related questions, and remind patients to take their medications. In the e-commerce sector, AI agents can assist with product recommendations, order tracking, and personalized shopping experiences. In information technology (IT) support, these agents can guide users through troubleshooting steps, helping them resolve software and hardware issues. Specifically, for network hazards, AI agents can diagnose connectivity problems, suggest corrective actions, and provide step-by-step guidance to ensure network security and stability. Their versatility and ability to handle diverse tasks make them valuable tools in enhancing efficiency and user experience in various fields.

AI agents often employ a neural network based generative language model to generate an output such as in the form of a text response, or a series actions to complete a complex task, such as to network issue troubleshooting, etc. Such generative language model receives a natural language input in the form of a sequence of tokens, and in turn generates a predicted distribution over a token space conditioned on the input sequence. Generated output tokens over time may in turn form the text response, or actions for completing the task. However, existing methods that organize data for AI agent do not have a comprehensive coverage on the connection amongst entities in a document.

BRIEF DESCRIPTION OF THE DRAWINGS

FIG. 1 shows an application of an LLM based AI conversation agent, according to embodiments of the present disclosure.

FIG. 6 is an example logic flow diagram illustrating a method of building an artificial intelligent (AI) conversation agent using an indexing tree based on the framework shown in FIGS. 1, 2A-2D, 3, 4 and 5, according to some embodiments.

FIGS. 7A-7G provide charts illustrating exemplary performance of different embodiments described herein.

Figure 2A:
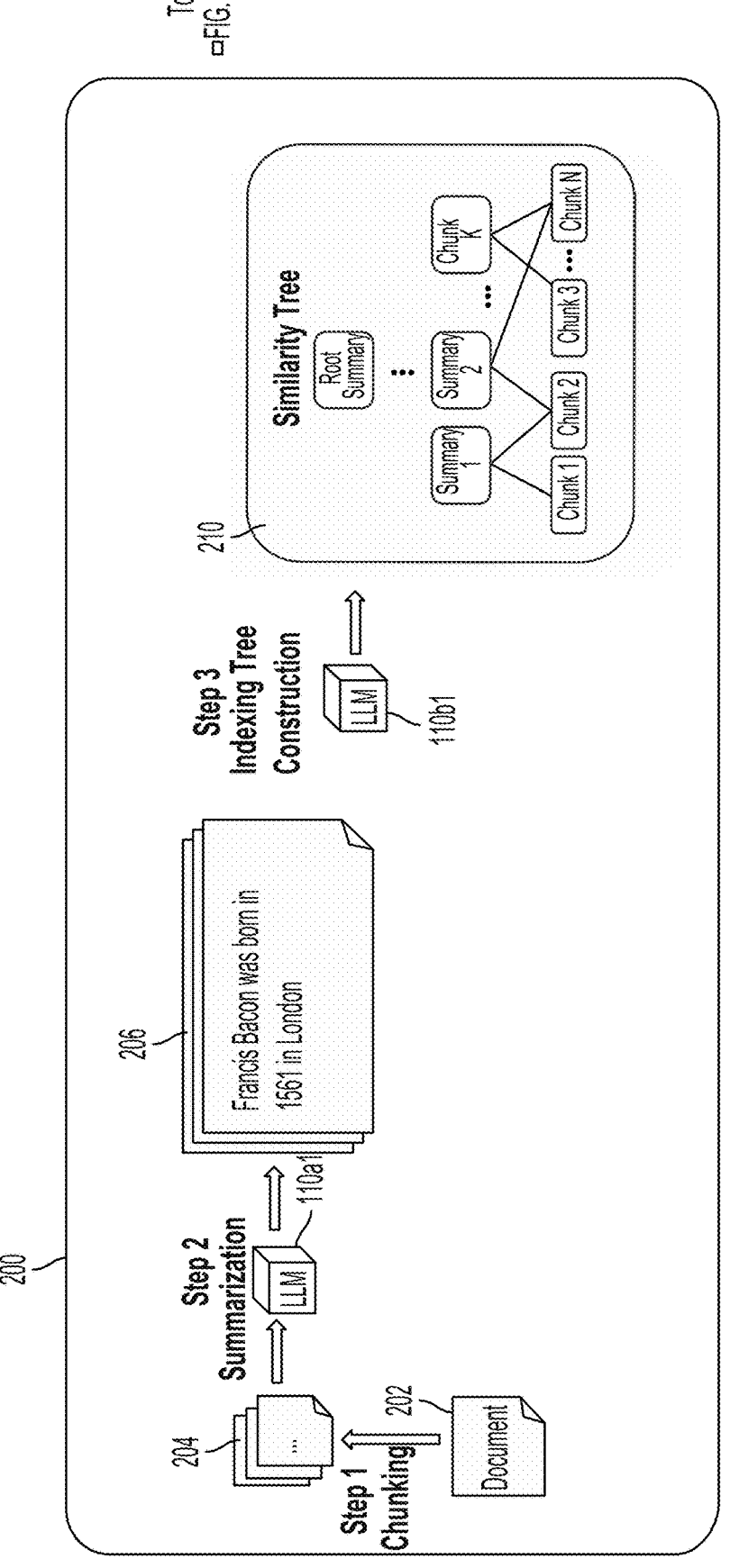
FIG. 2A is a simplified diagram illustrating aspects of a framework for generating and/or synthesizing an indexing tree for finetuning LLM(s), according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

As used herein, the term "Transformer" may refer to an architecture of a deep learning model designed to process sequential data, such as text, using a mechanism called self-attention. The Transformer architecture handles an entire input sequence of tokens (such as words, letters, symbols, etc.) in parallel, and often generate an output sequence of tokens sequentially. The Transformer architecture may comprise a stack of Transformer layers, each of which contains a self-attention module to weigh the importance of each token relative to other tokens in the sequence and a feed-forward module to further transform the data. Additional details of how a Transformer neural network model processes input data to generate an output is provided in relation to FIG. 4.

As used herein, the term "Large Language Model" (LLM) may refer to a neural network based deep learning system designed to understand and generate human languages. An LLM may adopt a Transformer architecture that often entails a significant amount of parameters (neural network weights) and computational complexity. For example, LLM such as Generative Pre-trained Transformer (GPT) 3 has 175 billion parameters, Text-to-Text Transfer Transformers (T5) has around 11 billion parameters. An LLM may comprise an architecture of mixed software and/or hardware, e.g., including an application-specific integrated circuit (ASIC) such as a Tensor Processing Unit (TPU).

As used herein, the term "generative artificial intelligence (AI)" may refer to an AI system that outputs new content that does not pr-exist in the input to such AI system. The new content may include text, images, music, or code. An LLM is an example generative AI model that generate tokens representing new words, sentences, paragraphs, passages, and/or the like that do not pre-exist in an input of tokens to such LLM. For example, when an LLM generate a text answer to an input question, the text answer contains words and/or sentences that are literally different from those in the input question, and/or carry different semantic meaning from the input question.

Overview

Retrieval augmented generation (RAG) LLM may comprise a retrieval component that searches a large database of documents to find the most relevant pieces of information based on an input query and a generative LLM that contextually relevant text based on the input query and the retrieved information. For example, the retrieval component may comprise a search engine or a specialized retrieval model. The retrieved documents or snippets may serve as a source of information for the generative LLM. In this way, by grounding the generation in real-world documents, RAG LLMs can produce more factually accurate and relevant responses. Also, as the retrieval component can access up-to-date information, RAG LLMs are often able to generate texts on topics that evolve over time, without constant re-training or finetuning.

RAG LLM may first search a large database of documents to find the most relevant pieces of information based on an input query and then use a generative LLM to generate a contextually relevant text based on the input query and the retrieved information. An indexing tree is a hierarchical data structure used to organize and search through the large database of documents more efficiently. For a RAG LLM, an indexing tree includes nodes that represent text related to a document and relationships that connect the nodes. A node in an indexing tree represents a summary of the documents that are its children.

For example, in a RAG LLM, the indexing tree may be constructed based on similarity, referred to as a "similarity tree." The similarity tree organizes document text chunks as leaf nodes, clustering them based on semantic similarity. Each cluster is then assigned a parent node that summarizes its constituent chunks. This hierarchical structure continues upward, where nodes at each level are further clustered, summarized, and used to construct the next level. However, while this similarity tree effectively captures semantic similarity, it fails to model entity-relatedness across documents. As a result, connections between conceptually linked but non-similar entities remain unrepresented, leading to suboptimal retrieval and/or generation performance of the RAG LLM.

In view of the need for an indexing tree that reflects the relatedness amongst entities across documents, embodiments described herein provide an indexing tree synthesis pipeline to generate indexing trees from long documents so as to serve a RAG LLM based AI chat agent. Specifically, a database search tool, referred to as a relatedness tree and a similarity-relatedness tree are constructed. Both indexing trees include nodes that are related by the same entity, enhancing the relatedness amongst information of the document. To construct the indexing trees, chunks of a document are extracted, and propositions indicative of entity-specific factual knowledge are extracted from the chunks. Proposition aggregates are formed, each including one or more propositions (different pieces of factual knowledge) of the same entity. The chunks, propositions, and proposition aggregates can then be synthesized respectively into a relatedness tree and a similarity-relatedness tree for the document. Therefore, the retrieval component may search one or more indexing tree based on a received user query to retrieve chunks and/or propositions of the document, which are in turn input to an LLM to generate a response.

In one embodiment, a database search tool, referred to as a relatedness tree and/or a similarity tree, or a combination thereof, may be constructed. The two types of search indexing trees may be constructed separately as two search indexing trees, or jointly as a combined search tree. To construct such indexing trees, chunks of a document are extracted, and propositions indicative of entity-specific factual knowledge are extracted from the chunks. The similarity tree is constructed based on textual similarity between text chunks from documents (e.g., Cosine similarity between text embedding vectors, etc.) through recursive summarization upward, e.g., at each level, nodes of similarity are clustered and a summary of these nodes of texts is generated as an upper-level mode. On the other hand, the relatedness tree is formed using propositions, e.g., facts indicative of one or more entities in the text chunk or the document. For example, starting from a document or text chunks from the document, propositions each indicative of a fact about one or more entities are extracted to form the bottom level of the tree; then, all propositions about the same entity are aggregated to create a proposition aggregate which form nodes of an upper level. Then, recursively, additional level of nodes are built through summarization from the level these proposition aggregates. Additional details of constructing the search trees are described below in relation to FIG. 2A-2B.

In one embodiment, for a RAG LLM to retrieve a context in response to a user query based on the constructed indexing trees, the one or more indexing trees may be traversed from a root (summary) level to retrieve the top-K relevant nodes (summaries) based on a similarity between the respective summary and the user query. The retrieval may recursively go down the indexing tree, e.g., the top-K relevant child nodes of a selected parent node may be selected at each level, until the nodes at the proposition aggregate level are selected. All the selected nodes (summaries, proposition aggregates, etc.) may then be "flattened" (concatenated) as a context, based on which the LLM generates a response to the user query.

In another embodiment, the RAG LLM may retrieve a context from a flattened tree, e.g., the hierarchical indexing tree may be flattened by including all summaries and proposition aggregate nodes into a single layer. Then the summaries and proposition aggregates are retrieved, until a threshold number of tokens is reached, based on cosine similarity to the query vector. A concatenation of the retrieved nodes of summaries and proposition aggregates are then fed as a context for the LLM to generate a response.

Embodiments described herein provide a number of benefits. For example, with the indexing tree more accurately covers the relatedness amongst entities, the RAG can generate answers (in response to user queries) with higher efficiency and higher factual accuracy for the AI chat agent. Therefore, with improved performance on text generation, neural network technology in AI assisted chatbots, such as chatbots for healthcare, network issue support, autonomous driving, or the like, may be improved.

FIG. 1 shows an example application 100 of an LLM based AI agent, according to embodiments of the present disclosure. A user 102 may utter a query 106 in natural language. In response, a user device 104 may output/display an answer 108 on a display interface, such as a screen. In some embodiments, answer 108 is the output of an artificial intelligence (AI) agent, which is built on a bot server that is communicatively connected to user device 104. The AI agent may be based on, or include, an LLM. In some embodiments, the LLM receives query 106 through utterance of user 102, which may retrieve a corpus of documents, and generate an output based on the retrieved documents.

As an example, query 106 may include a question of "Who is the father of the artist who painted Head I?" The AI agent may include the query 106 in a predefined format providing instruction to the LLM how to generate a response to query 106, referred to as a "prompt," which may be fed to an LLM as input. The LLM 110 may in turn provide answer 108, e.g., a summary of names in a predetermined format, e.g., a bullet-point format, such that one name is listed behind a bullet-point. In some aspects, for example, a citation of document(s) that mentioned the name is provided behind the respective bullet.

The underlying LLM may be implemented at user device 104, or at a remote server which is accessible by the user device 104. The LLM may be trained with a large corpus of texts and/or documents to provide a user desirable response as further described in FIGS. 2A-2D below.

FIG. 2A is a simplified diagram illustrating aspects of a data pipeline 200 for generating and/or synthesizing an indexing tree of documents based on semantic similarity between text contents of the documents for an AI agent or LLM 110 to search and/or retrieve a context in response to a user query, according to embodiments described herein. For example, two documents, or two segments of the same document, may be evaluated on how similar they are, using a similarity metric such as similarity, which is defined as the distances between embeddings of text pieces. Similar documents and/or segments (e.g., with a high similarity metric) may thus be linked and/or grouped together in the indexing tree.

As shown in FIG. 2A, an indexing tree synthesis pipeline 200 may generate indexing trees from documents using LLMs 110a1 and 110b1. For example, indexing trees may be generated from documents 202 using larger LLMs 110a1 and 110b1, such as GPT-4o, Llama-3.1-70B-Instruct. The generated indexing trees together with documents 202 may form document-tree pairs to train a smaller LLM 110f (such as Mistral-7B-Instruct-v0.3 model) to generate an indexing tree based on an input document. In this way, the smaller LLM 110f may then be used to generate indexing trees with accuracy and efficiency.

In one embodiment, the indexing tree synthesis pipeline 200 performs document chunking, followed by clustering, followed by summarization of the chunks in cluster, and indexing tree construction. In some embodiments, a LLM (not shown) generates one or more chunks of low abstractiveness and one or more chunks of high abstractiveness. In some embodiments, abstractiveness of text may refer to the degree to which a piece of text summarizes, condenses, and/or transforms information compared to an original content it is based on. For example, the chunks of low abstractiveness may refer to text chunks that describe fine-trained details about a topic, and the chunks of high abstractiveness may refer to text chunks that provide an overview of a topic and summarize fine-grained details. LLM 110a1 may determine the abstractiveness (e.g., high or low) of a text chunk, and may generate one or more summaries when given an input prompt, with each summary from one or more chunks of low abstractiveness. LLM 110b1 may then construct an indexing tree (e.g., a similarity tree) of two-level hierarchy, with the chunks of low abstractiveness being the nodes in the first level (e.g., bottom level), and the summaries and the chunks of high abstractiveness being the nodes in the second level (e.g., the level above the bottom level). In some embodiments, a chunk of high abstractiveness provides an overview of one or more chunks of low abstractiveness. A node (e.g., a parent node) in the second level may be linked to one or more nodes (e.g., child nodes) in the first level, based on the summarization relationship and/or the abstractiveness levels. In some embodiments, the similarity tree includes a third level, which includes recursive summaries of the summaries and chunks in the second level.

For example, as shown in FIG. 2A, given a document 202 in a database for RAG, the document 202 may be split into a plurality of segments (referred to as "chunks") 204. This chunking process may be done along sentence boundaries, without overlap, to preserve semantic coherence and avoid redundancy. Segments of low abstractiveness may be summarized to generate one or more summaries 206. A similarity tree 210 is constructed to include nodes of a first (lowest) level of nodes representing chunks of low abstractiveness (e.g., chunk 1, chunk 2, . . . , chunk N). For example, an LLM 110b2 may determine which low abstractiveness chunks (e.g., chunk 1, chunk 2, . . . , chunk N) are similar, e.g., by comparing a Cosine similarity metric between the encoded embeddings of the chunks. The LLM 110b2 may then generate a summary of similar chunks. For instance, as shown in FIG. 2A, when Chunk 1 and Chunk 2 has a similarity metric greater than a metric, LLM 110b2 may generate Summary 1 of Chunk 1 and Chunk 2. Such summaries (e.g., summary 1, summary 2, . . . ) generated from similar chunks from the lower level may form nodes of a second level.

In some implementations, the second level may also include summaries chunks of high abstractiveness (e.g., chunk K). A summary may be linked to one or more chunks of low abstractiveness (e.g., because of the similarity/similarities amongst the chunks of low abstractiveness), and a chunk of high abstractiveness may be linked to one or more chunks of low abstractiveness (e.g., because of the similarity/similarities amongst the chunks of low abstractiveness).

In some embodiments, starting from the second level of Summary 1, . . . and Chunk K, LLM 110b may repeat the similarity-based summary generation process as described above to recursively generate the next upper level of nodes representing new "summaries" of nodes having similarity metrics greater than a threshold at the second level. The summarization process may continue constructing the indexing tree 210 in a bottom-up manner, until a top level having only one node, e.g., a root summary, is reached. In various embodiments, although only three levels are shown at 210 in FIG. 2A for illustrative purpose only, more than three levels can be constructed, and nodes of the third level and above are each a recursive summary of its children of the lower level.

Figure 2B:
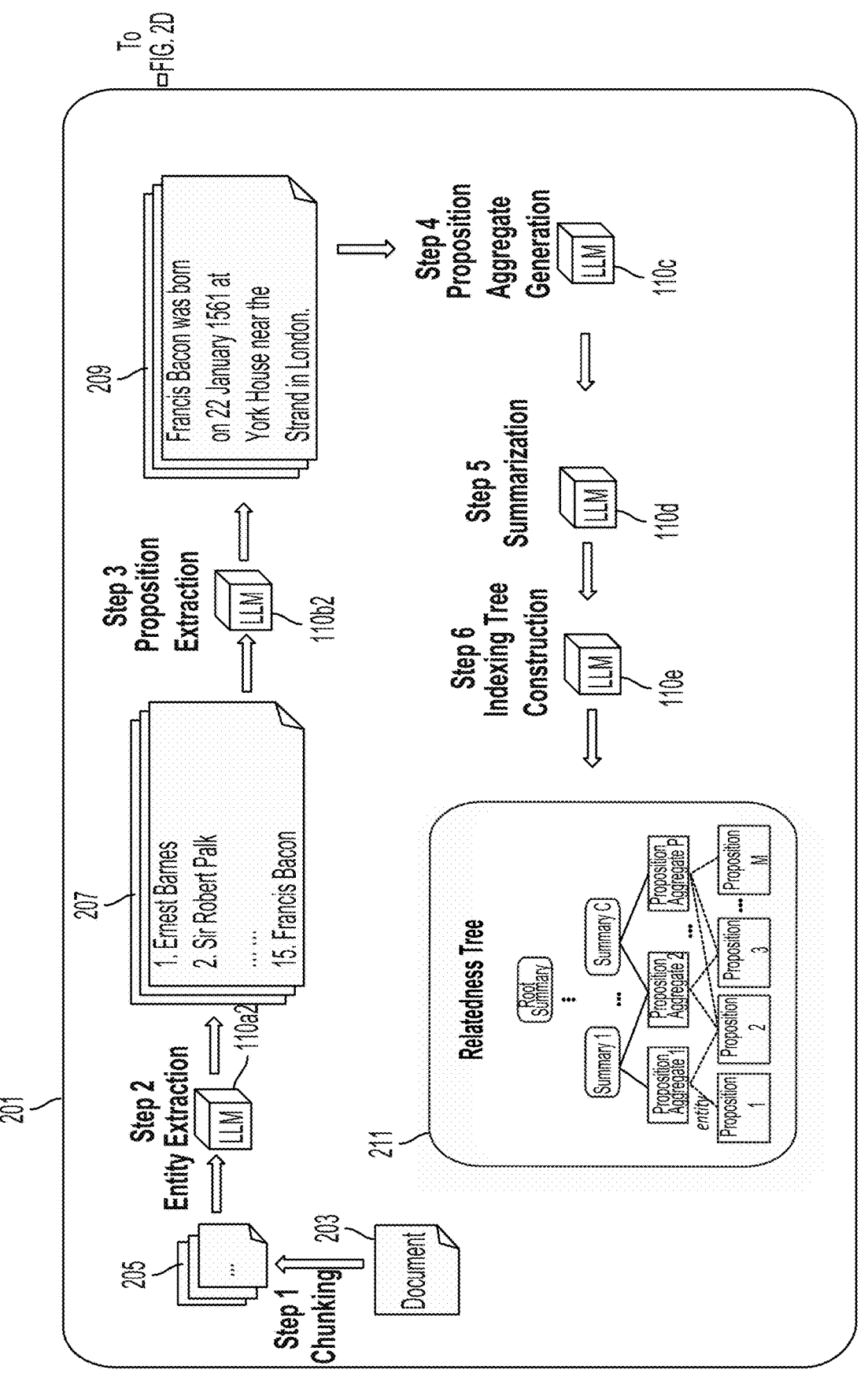
FIG. 2B is a simplified diagram illustrating aspects of a framework for generating and/or synthesizing another indexing tree for finetuning LLM(s), according to some embodiments.

FIG. 2B is a simplified diagram illustrating aspects of a data pipeline 201 for generating and/or synthesizing an indexing tree of documents based on content relatedness for AI agent or LLM 110 to search and/or retrieve a context in response to a user query, according to embodiments described herein. For example, in addition to textual or semantic similarity, two documents, or two segments of the same document, may be linked based on whether the textual contents are connected in meaning, context, or content. In some embodiments, relatedness is defined as the degree of connection of texts based on signals such as entities and/or propositions. For example, two pieces of texts are related because they share/mention the same entity/entities. Therefore, indexing tree 211 may be built by linking documents and/or segments of a document based on their relatedness.

As shown in FIG. 2B, an indexing tree synthesis pipeline 201 may generate indexing trees from documents using LLMs 110a2, 110b2, 110c-110e. For example, indexing trees may be generated from documents 202 using larger LLM 110a2, 110b2, 110c-110e, such as GPT-4o, Llama-3.1-70B-Instruct. The generated indexing trees together with documents 202 may form document-tree pairs to train a smaller LLM 110f (such as Mistral-7B-Instruct-v0.3 model) to generate an indexing tree based on an input document. In this way, the smaller LLM 110f may then be used to generate indexing trees with accuracy and efficiency.

In one embodiment, the indexing tree synthesis pipeline 201 performs document chunking, followed by entity extraction, proposition extraction, proposition aggregate generation, summarization, and indexing tree construction. In some embodiments, a LLM (not shown) generates one or more chunks 205 of a document 203 in a similar way as shown in FIG. 2A, each of which may include one or more entities. The LLM may receive an input prompt and rewrite the chunks to resolve entity references, e.g., inter-sentence pronoun references, acronyms, and/or the like, may be rewritten using the complete and accurate entity names.

An example input prompt for rewriting the chunks may take a form similar to the following:
Previous paragraph from Document:
Gualala, the isolated Mendocino Coast town with a name that leaves most visitors tongue-tied, is on a new list of the 50 best places to live in the United States. Men's Journal magazine describes Gualala as an outpost of adventure lifestyle in its latest edition, which goes on sale today. The magazine describes Gualala (pronounced wa-LA-la by locals) as one of the below-the-radar places to a make a move on before the word gets out. There were five such cities. The others were Homer, Alaska; Newport, Vt.; Logan, Utah; and Walla Walla, Wash. Rolling Stone magazine's Jann Wenner publishes Men's Journal, which has a paid circulation of about 620,000. Gualala joined. three other California communities on the magazine's list: Santa Cruz, Mammoth Lakes and Bishop. We were looking for places that combined affordability, proximity to outdoor adventure and a generally undiscovered quality of life, said Erica Kestenbaum, a spokeswoman for Men's Journal.
Instruction:
Rewrite the below paragraph by resolving all entity coreferences with the preceding paragraph from document.
  Resolve all inter-sentence pronoun references.
  Make sure that all pronouns in a sentence refers to some named entity with in the same sentence.
  Explicitly mention entity names wherever necessary to remove ambiguity from a sentence. Remember to make each sentence clear and unambiguous.
  For each entity, use only the one most informative name.
  Do not generate anything except the rewritten paragraph.
Paragraph:
She said isolation played a factor. In Northern California, it's particularly difficult to find a beautiful coastal setting that isn't entirely overrun she said. Gualala residents Monday were largely unaware of the magazine listing or the attention it could bring to the old logging town turned tourist center. A few coastal residents chuckled about any notion of affordability, given an influx of newcomers who've driven the median housing price to $580,000 compared to the median family income of $47,778. Others recalled an era when the Gualala region was better known for the logging of ancient redwoods, marijuana growing and boisterous beer drinking at the historic Gualala Hotel. Still there was a certain pride to the magazine's designation. Yvette White, a 25-year resident who works at the Gualala Sport; Tackle shop, said she's proud her town made it on the list.
Output:
Erica Kestenbaum said isolation played a factor. In Northern California, it's particularly difficult to find a beautiful coastal setting that isn't entirely overrun, Erica Kestenbaum said. Gualala residents Monday were largely unaware of the Men's Journal magazine listing or the attention it could bring to the old logging town turned tourist center. A few coastal residents of Gualala chuckled about any notion of affordability, given an influx of newcomers who've driven the Gualala's median housing price to $580,000 compared to the median family income of $47,778. Other Gualala residents recalled an era when the Gualala region was better known for the logging of ancient redwoods, marijuana growing and boisterous beer drinking at the historic Gualala Hotel. Still there was a certain pride to the Men's Journal magazine's designation. Yvette White, a 25-year Gualala resident who works at the Gualala Sport; Tackle shop, said she's proud her town made it on the list.
Previous paragraph from Document: [previous paragraph]
Instruction:
Rewrite the below paragraph by resolving all entity coreferences with the preceding paragraph from document.
  Resolve all inter-sentence pronoun references.
  Make sure that all pronouns in a sentence refers to some named entity with in the same sentence.
  Explicitly mention entity names wherever necessary to remove ambiguity from a sentence. Remember to make each sentence clear and unambiguous.
  For each entity, use only the one most informative name.
  Do not generate anything except the rewritten paragraph.
Paragraph: [paragraph]
Output:
  LLM 110a2 may receive an input prompt to extract one or more entities 207 from the rewritten chunks. Here, an "entity" may refer to the name and/or mention of an individual, a business, an event, and/or the like. In some implementations, entities and propositions may be extracted together from the rewritten chunks. LLM 110b2 may receive an input prompt to 1) extract all entities from the rewritten chunks, and 2) extract relevant propositions 209 and their associated entities. Here, a proposition may refer to as a factual statement describing a piece of information about one or more entities from a chunk. In some embodiments, the input prompt for extracting propositions and entities does not require each proposition to have associated entities. When LLM 110b2 is instructed/prompted to generate entities for each proposition, LLM 110b2 may be instructed to avoid generating common nouns as entities for those propositions that lack actually associated entities, because the common nouns can lead to the clustering of unrelated propositions based on common nouns, potentially introducing noise into the relatedness tree. For example, as illustrated in FIG. 7B, LLM 110b is instructed to avoid generating Drug as an entity for proposition 1 due to its ambiguity. Subsequently, propositions without associated entities may be excluded when constructing the relatedness tree, ensuring that only high-quality, entity-linked propositions are utilized.

In some embodiments, the propositions and the entities may be consolidated with the document (e.g., 203) as the training data to fine-tune LLM 110f, e.g., Mistral-7B-Instruct-v0.3. LLM 110f may be a smaller model compared to LLMs 110a2 and 110b2, and can be used to extract propositions and their associated entities from a document after training. In some embodiments, the entities and the document (e.g., 203) are used as training data to train LLM 110a2. In some embodiments, the propositions, entities, and the document (e.g., 203) are used as training data to train LLM 110b2. For example, the generation of the LLM(s) may be compared to a ground-truth to compute a loss, and the LLM(s) may be updated by backpropagation based on the loss.

An example input prompt for extracting the propositions 209 and associated entities 207 in the rewritten chunks may take a form similar to the following:

Instructions.

Generate only the most informative name for each named entity. Example: If John P., Parker, John Parker are coreferential, only generate John Parker.

Consistently use the most informative name for each named entity in all facts.

You must not include pronouns or ambiguous references in facts. Directly include all relevant named entities.

Respond using json format provided below:

```
{
    "f1": {
        "fact": "A factual statement describing important
            information (preferably about some entities|from
            the paragraph", "entities: | "entity 1", "entity 2",
            "entity 3")
    }
    "f2": { },
}
```

Below is an example for reference.

Paragraph: Locked in a heated battle with Novo Nordisk's semaglutide franchise, Eli Lilly's tirzepatide is beginning to come into its own-both with regards to sales and amid attempts to show the dual GIP/GLP-1 agonist can strike out beyond diabetes and obesity. As Mounjaro, tirzepatide won its first FDA nod in Type 2 diabetes back in May 2022. An obesity approval followed last November, with that formulation of tirzepatide adopting the commercial moniker Zepbound. In 2023's fourth quarter, Mounjaro generated a whopping $2.2 billion in sales, a nearly eight-fold increase over the $279 million it pulled down during the same stretch in 2022. Year-to-date, the drug brought home around $5.2 million in revenues. Lilly said in an earnings release Tuesday, Zepbound, for its part, generated $175.8 million during its first quarter on the market. Overall, Lilly reeled in around $9.4 billion in fourth-quarter sales, growing 28% over the $7.3 billion it made for the quarter in 2022.

Entities: Eli Lilly, Novo Nordisk, Tirzepatide, Semaglutide, dual GIP/GLP-1 agonist, FDA, Mounjaro, Zepbound diabetes, Type 2 diabetes, Obesity.

Output:

```
{
f1":
{"fact": "Eli Lilly's tirzepatide is competing with Novo
    Nordisk's semaglutide franchise.",
"entities": ["Eli Lilly", "Novo Nordisk", "tirzepatide",
    "semaglutide"]
},
"f2": {
"fact": "Eli Lilly is trying to show tirzepatide, the dual
    GIP/GLP-1 agonist, can strike out beyond diabetes and
    obesity.",
"entities": ["tirzepatide", "dual GIP/GLP-1 agonist",
    "diabetes", "obesity"]
},
"f3":
```

```
{"fact": "Tirzepatide, under the brand name Mounjaro,
    received its first FDA approval for Type 2 diabetes in
    May 2022.",
"entities": ["tirzepatide", "Mounjaro", "FDA", "Type 2
    diabetes"]
},
"f4": {
"fact": "Tirzepatide, under the brand name Zepbound,
    received an obesity approval in November 2022.",
"entities": ["tirzepatide", "Zepbound", "obesity"]
},
"f5": {
"fact": "Mounjaro generated $2.2 billion in sales in the
    fourth quarter of 2023, an eight-fold increase from the
    $279 million during the same period in 2022.",
"entities": ["Mounjaro"]
},
"f6": {
"fact": "Mounjaro brought in around $5.2 billion in
    revenues year-to-date in 2023, Lilly said in an earnings
    release Tuesday.",
"entities": ["Mounjaro", "Eli Lilly"]
},
"f7": {
"fact": "Zepbound generated $175.8 million in sales in its
    first quarter on the market.", "entities": ["Zepbound"]
},
"f8": {
"fact": "Eli Lilly's fourth-quarter sales were around $9.4
    billion, a 28% increase over the $7.3 billion during the
    same period in 2022.",
"entities": ["Eli Lilly"]
}
}
}
```

Upon obtaining propositions 209, LLM 110c may receive an input prompt to consolidate propositions that mention the same entity (or same entities) to a proposition aggregate. In some embodiments, LLM 110c is instructed to concatenate related propositions that share the same entity (or entities) and maintain their original order in the document (e.g., 203). For example, a proposition of "Francis Bacon was born on 22 Jan. 1561" and a proposition of "Francis Bacon is known for establishing a significant part of scientific philosophy and science methodology" may be aggregated into a proposition aggregate, as both of them mention the same entity "Francis Bacon."

LLM 110d may receive a prompt instruction to generate recursive summaries of the proposition aggregates. LLM 110e may receive a prompt instruction to recursively construct the relatedness tree 211, in a similar recursive manner as indexing tree 210 is constructed in FIG. 2A, but instead based on relatedness instead of textual similarity between texts. LLM 110e may be instructed to construct a three-level hierarchy, which includes a plurality of propositions (extracted by LLM 110b2) as nodes in the first level, one or more proposition aggregates (generated by LLM 110c) as nodes in the second level, and one or more recursive summaries (generated by LLM 110d) as nodes in the third level. In some embodiments, the relatedness tree 211 includes a fourth level, which includes a root summary of the recursive summaries. A node can be the parent node of one or more child nodes in the lower level. In various embodiments, a hierarchy of more than four levels is constructed, and one or more levels of recursive summaries can be formed.

Each proposition aggregate in the relatedness tree 211 is linked to one or more propositions that mention the same entity (same entities). Each summary in the third level is linked to one or more proposition aggregates from which the summary is generated. Any summary in a fourth level (e.g., the root summary) is linked to one or more summaries in the third level from which the summary in the fourth level is generated from.

For example, as shown in FIG. 2B, given a document 203 in a database for RAG, the document 203 may be split into a plurality of segments (referred to as "chunks"). This chunking process may be done along sentence boundaries, without overlap, to preserve semantic coherence and avoid redundancy. In some embodiments, the chunks are rewritten to form the rewritten chunks 205, as described above. Entities 207 are extracted from the rewritten chunks 207, and propositions 209 and associated entities are extracted from the rewritten chunks 207.

The propositions (e.g., proposition 1, proposition 2, ..., proposition M) may thus form the lowest level of nodes on indexing tree 211. LLM 110e may then generate proposition aggregates by concatenating of propositions mentioning the same entity (or same entities), which form the second level of nodes (e.g., proposition aggregate 1, proposition aggregate 2, ..., proposition aggregate P) on the indexing tree 211. LLM 110e may further determine the relatedness of the proposition aggregates, and generate a summary for one or more related proposition aggregates to form an upper level of nodes (e.g., summary 1, ..., summary C). LLM 110e may thus repeatedly evaluate and determine which nodes are related on a level on the relatedness tree, and generate summaries to form the next upper level of nodes, until only one node of a root summary may be formed.

In this way, nodes in the relatedness tree 211 are linked together based on their relatedness, e.g., a summary in the third level may be linked to one or more related propagate aggregates from which the summary is generated., a proposition aggregate may be linked to one or more related propositions mentioning the same entity (or same entities), and/or the like.

Figure 2C:
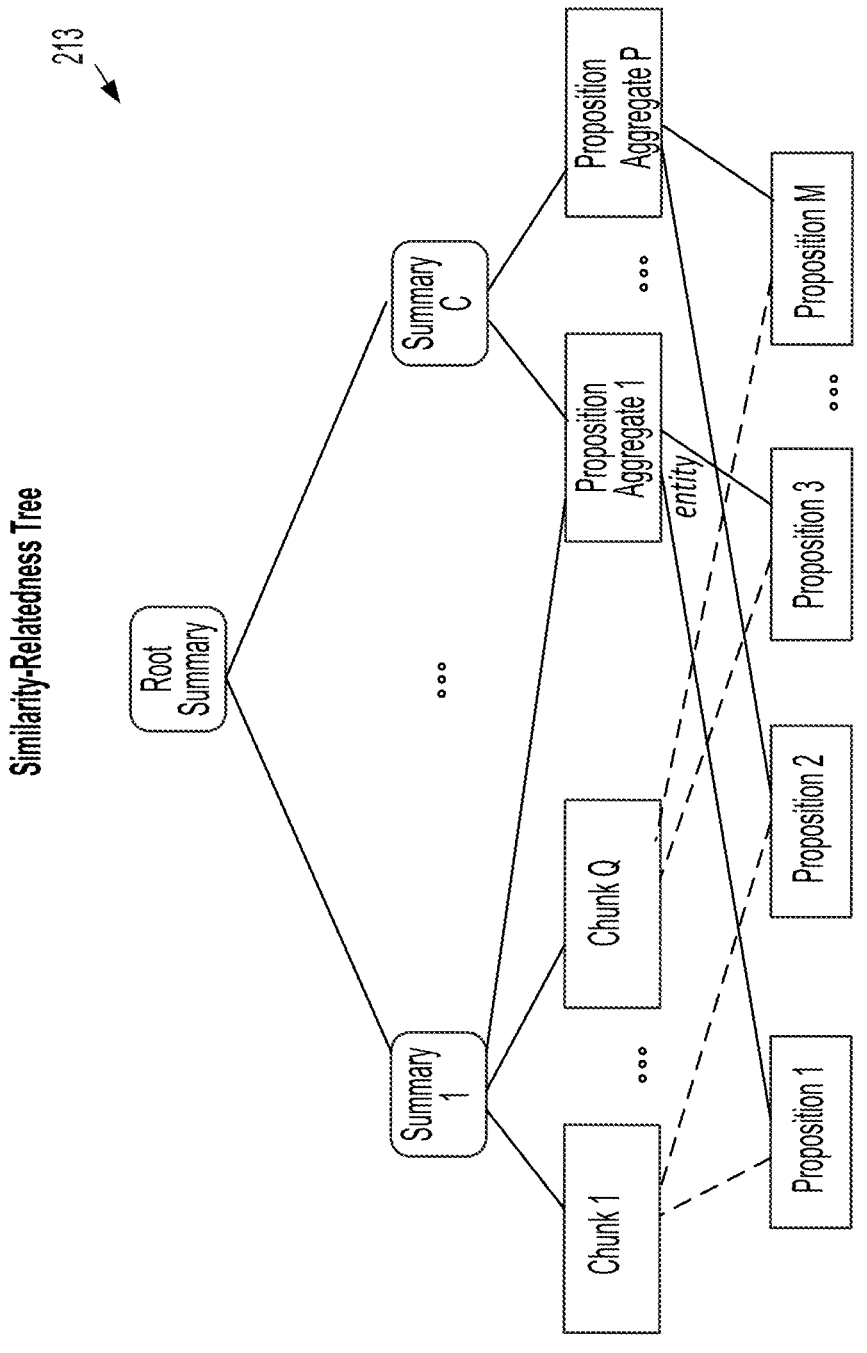
FIG. 2C shows another indexing tree for finetuning LLM(s) generated by the framework in FIG. 2B, according to some embodiments.

In some embodiments, indexing tree synthesis pipeline 201 may be configured to generate a combined similarity-relatedness tree 213 that links texts based on both similarity and relatedness, as shown in FIG. 2C. In some embodiments, starting from rewritten chunks 205 in FIG. 2B, an LLM 110b2 is instructed to extract a plurality of propositions as nodes in the first level. One or more proposition aggregates based on relatedness of the propositions (as generated by LLM 110c in a similar manner as described in FIG. 2B) form part of the second level. Similarly, the rewritten chunks (e.g., 205) from which the propositions are generated, also form nodes in the second level. From then on, LLM 110e may recursively generate summaries as nodes in the next upper level, based on the similarity between nodes, relatedness between nodes, and both.

For example, LLM 110e may be instructed to generate a summary based on two chunks, e.g., Chunk 1 and Chunk Q, based on their similarity metrics. In another example, LLM 110e may be instructed to generate a summary based on two proposition aggregate, e.g., Proposition Aggregate 1 and Proposition Aggregate P, based on their relatedness. For another example, LLM 110e may be instructed to generate a summary based on a mix of chunks and proposition aggregates, based on their similarity metrics and relatedness.

The incorporation of relatedness (e.g., reflected in a proposition component and proposition aggregates of the same entity (or same entities) in constructing an indexing tree may have several advantages. First, the constructed indexing tree can effectively mimic soft clustering as a single proposition may belong to multiple aggregates. Secondly, when constructing recursive summaries, the shared propositions across different aggregates result in high embedding similarity, ensuring that these aggregates remain clustered together even at higher levels in the indexing tree.

Figure 2D:
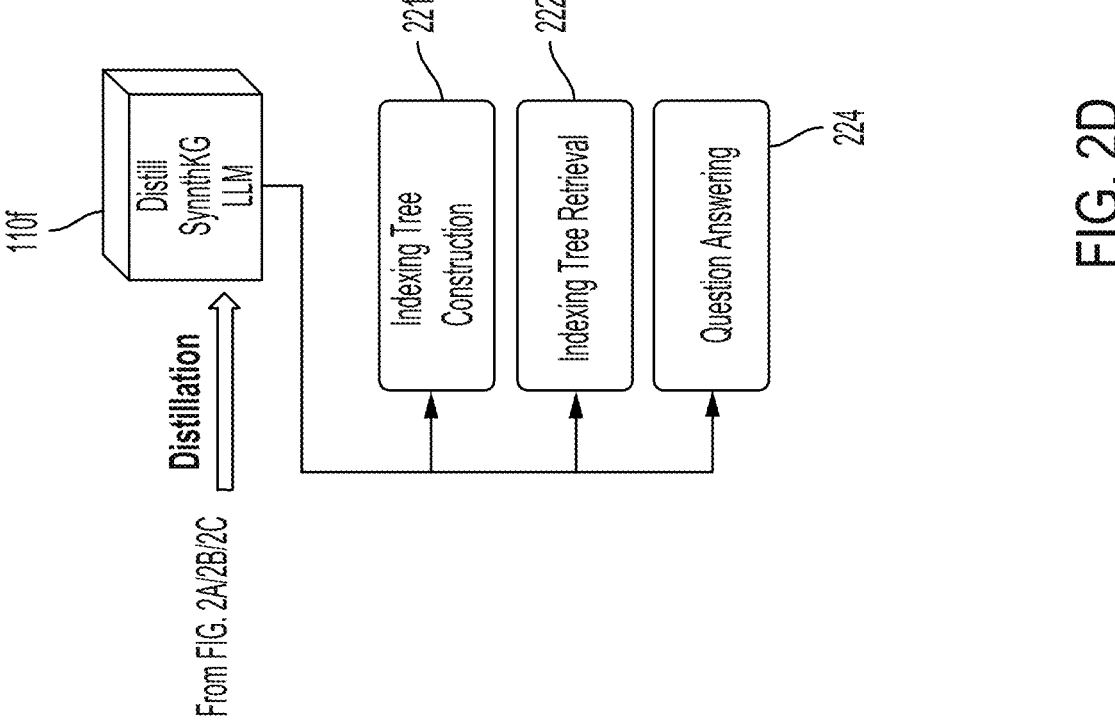
FIG. 2D shows a simplified diagram illustrating the finetuning of a LLM using an indexing tree, according to some embodiments.

In one embodiment, instead of using LLMs 110a1/110a2, 110b1/110b2, 110c-110e to construct the indexing trees (e.g., 210) for each document (e.g., 202 or 203) in a document database, a relatively smaller LLM 110f, as shown in FIG. 2D, may be trained using the document-indexing tree pairs to directly generate an indexing tree for an input document. For example, the indexing tree synthesis pipeline 200/201 may construct an indexing tree for each document in a database, which entails repeatedly prompting an LLM 110a1/110a2, 110b1/110b2, 110c-110e. When LLM 110a1, 110b1, 110a2, 110b2, 110c-110e are housed at an external server, substantial computational or application programming interface (API) costs may be incurred. To improve computational efficiency, a smaller LLM 110f may be trained by the document (e.g., 202 or 203) and the indexing tree 210/211/213 pair. Specifically, a smaller LLM 110f (e.g., fewer number of layers, fewer number of parameters, or otherwise requiring less computational resource, etc.) may be finetuned to take an entire document 202/203 as input, to directly generate a predicted indexing tree to be compared with the ground-truth indexing tree 210/211/213. In this way, the smaller LLM 110f may be trained to generate an indexing tree (e.g., 225) in a single inference step.

In some embodiments, the smaller LLM 110f may be trained by the document 202/203 and the indexing tree 210/211/213 pair for indexing tree construction 221, an indexing tree retrieval 222, question answering 224 (based on the indexing tree), and/or the like. For example, to finetune the smaller LLM 110f for indexing tree retrieval 222 and/or question answering 224 (based on a retrieved graph), the smaller LLM 110f may act as a text retriever (e.g., a retrieval component).

In some embodiments, to respond to a user query, a RAG LLM may conduct a tree traversal on the indexing tree to retrieve relevant propositions, proposition aggregates, and/or text chunks from the indexing trees as a context for generating a response to the user query.

For example, the retrieval process begins by identifying the most relevant root summaries or summaries at higher level of the indexing tree-those whose embeddings have the highest cosine similarity to the user query. From these nodes of the selected summaries, the search iteratively moves down the indexing tree, selecting the top-k most relevant child nodes at each level based on their similarity to the query embedding. This retrieval continues until it reaches the proposition aggregate nodes, ensuring that only the most contextually relevant information is retrieved. Finally, the text from all selected nodes—from the root down to the proposition aggregate nodes—is concatenated to form the retrieved context, which is then fed into the neural network-based language model alongside the user query to generate a response.

In another embodiment, the RAG LLM may search the indexing tree in a "collapsed" matter. For example, the hierarchical indexing tree may be flattened by including all summaries and proposition aggregate nodes into a single layer. Then the summaries and proposition aggregates are retrieved from the single layer, based on cosine similarity to the query vector, until a threshold number of tokens is reached. A concatenation of the retrieved nodes of summaries and proposition aggregates are then fed as a context for the LLM to generate a response.

In one embodiment, the above tree traversal and the collapsed tree traversal on indexing tree 210/211/213 may be further described in the RAPTOR tree traversal (described in Sarthi et al., Raptor: Recursive abstractive processing for tree-organized retrieval. arXiv preprint arXiv: 2401.18059, 2024), which is hereby expressly incorporated by reference herein in its entirety.

Computer and Network Environment

Figure 3:
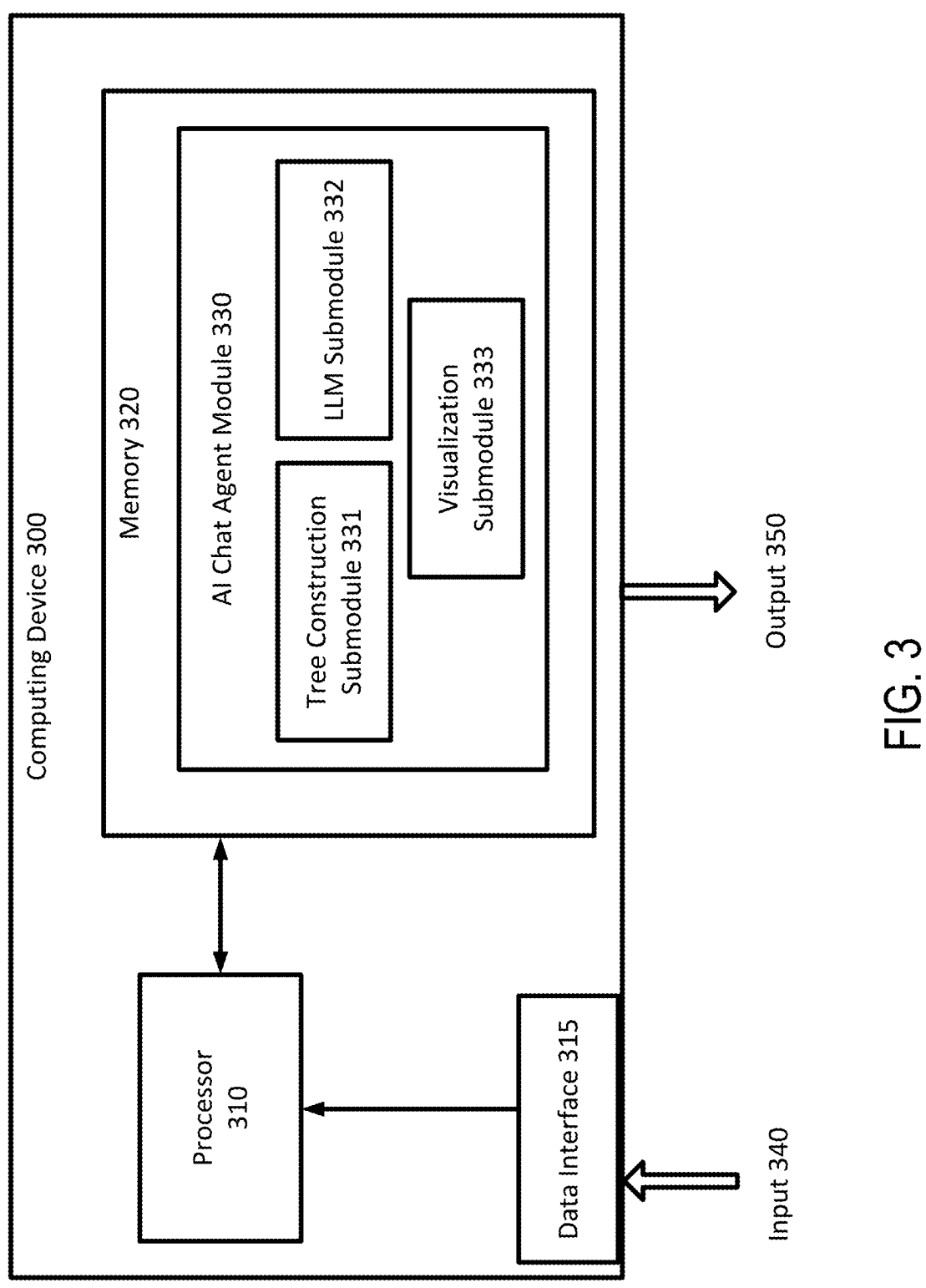
FIG. 3 is a simplified diagram illustrating a computing device implementing the AI chat agent described in FIGS. 1, 2B-2D, and 3, according to some embodiments.

FIG. 3 is a simplified diagram illustrating a computing device implementing the AI chat agent described in FIGS. 1, and 2A-2D, according to one embodiment described herein. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

Figure 4:
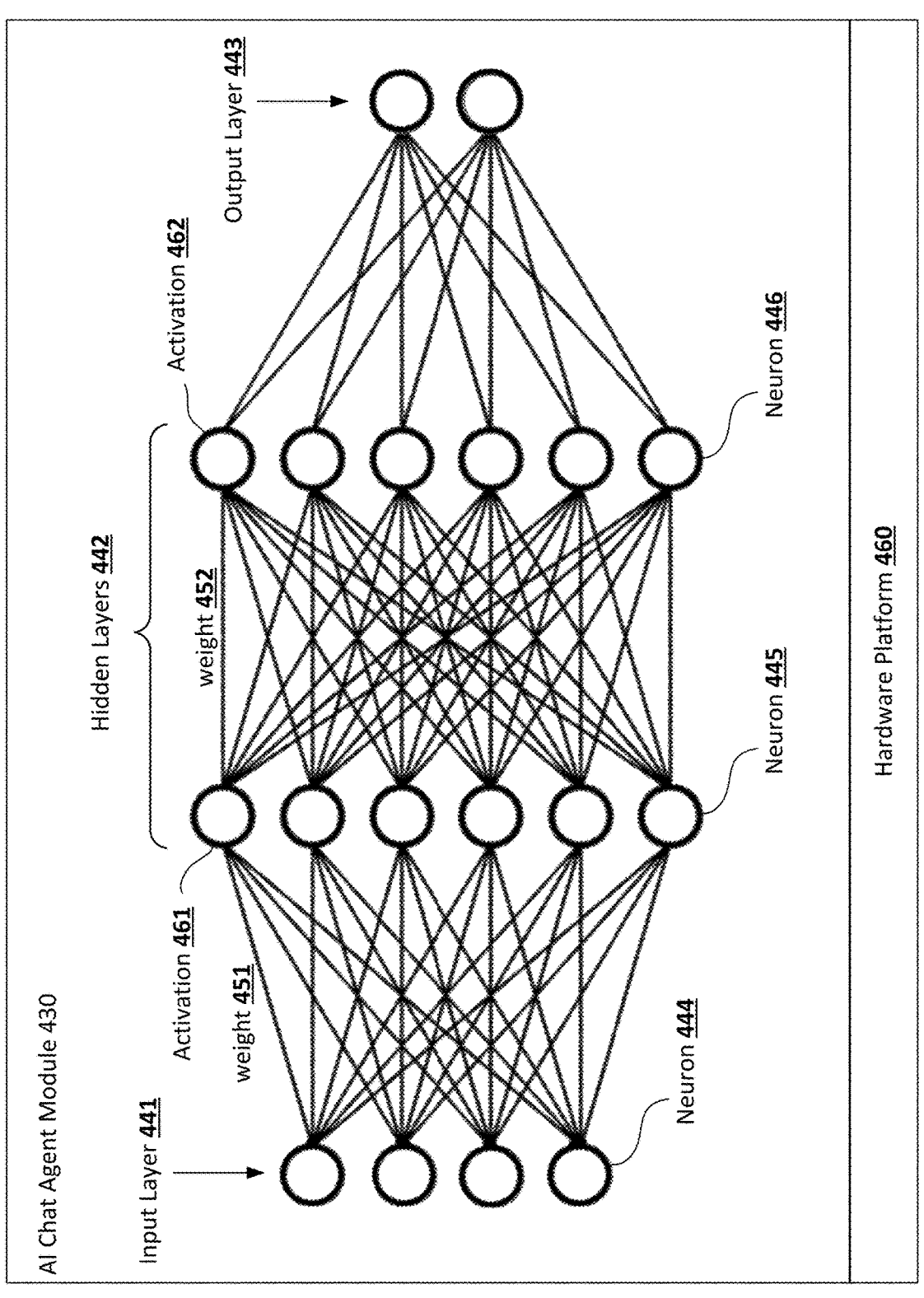
FIG. 4 is a simplified diagram illustrating a neural network structure, according to some embodiments.

In another embodiment, processor 310 may comprise multiple microprocessors and/or memory 320 may comprise multiple registers and/or other memory elements such that processor 310 and/or memory 320 may be arranged in the form of a hardware-based neural network, as further described in FIG. 4.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for AI chat agent module 330 that may be used to implement and/or emulate the systems and models, and/or to implement any of the methods described further herein. AI chat agent module 330 may receive input 340 such as an input training data (e.g., a user query, an/or document-indexing tree pairs) via the data interface 315 and generate an output 350 which may be a response to the user query.

The data interface 315 may comprise a communication interface, a user interface (such as a voice input interface, a graphical user interface, and/or the like). For example, the computing device 300 may receive the input 340 (such as a training dataset) from a networked database via a communication interface. Or the computing device 300 may receive the input 340, such as a user query, from a user via the user interface.

In some embodiments, the AI chat agent module 330 is configured to generate a response to a user query for a plurality of tasks, such as IT support, customer service, virtual learning, machine translation, and/or the like. The AI chat agent module 330 may further include a LLM submodule 331, a tree construction submodule 332, and a visualization submodule 333. Tree construction submodule 331 may be configured to cause various LLMs to generate/extract data (e.g., chunks, propositions, proposition aggregates, summaries, etc.) used for constructing an indexing tree, and construct the indexing tree from the extracted data. For example, tree construction submodule 331 may include similar functions as LLMs 110a1, 110a2, 110b1, 110b2, 110c, 110d, and/or 110e. LLM submodule 332 may be configured to train a LLM (e.g., 110f), and generate a response to a user query using a LLM based on an indexing tree. Visualization submodule 333 may be configured to display the response on a user device.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

FIG. 4 is a simplified diagram illustrating the neural network structure implementing the AI chat agent module 330 described in FIG. 3, according to some embodiments. In some embodiments, the AI chat agent module 330 and/or one or more of its submodules 331-333 may be implemented at least partially via an artificial neural network structure shown in FIG. 4. The neural network comprises a computing system that is built on a collection of connected units or nodes, referred to as neurons (e.g., 444, 445, 446). Neurons are often connected by edges, and an adjustable weight (e.g., 451, 452) is often associated with the edge. The neurons are often aggregated into layers such that different layers may perform different transformations on the respective input and output transformed input data onto the next layer.

For example, the neural network architecture may comprise an input layer 441, one or more hidden layers 442 and an output layer 443. Each layer may comprise a plurality of neurons, and neurons between layers are interconnected according to a specific topology of the neural network topology. The input layer 441 receives the input data (e.g., 340 in FIG. 3), such as a user query. The number of nodes (neurons) in the input layer 441 may be determined by the dimensionality of the input data (e.g., the length of a vector of a user query). Each node in the input layer represents a feature or attribute of the input.

The hidden layers 442 are intermediate layers between the input and output layers of a neural network. It is noted that two hidden layers 442 are shown in FIG. 4 for illustrative purpose only, and any number of hidden layers may be utilized in a neural network structure. Hidden layers 442 may extract and transform the input data through a series of weighted computations and activation functions.

For example, as discussed in FIG. 3, the AI chat agent module 330 receives an input 340 of a user query and transforms the input into an output 350 of a response to the user query. To perform the transformation, each neuron receives input signals, performs a weighted sum of the inputs according to weights assigned to each connection (e.g., 451, 452), and then applies an activation function (e.g., 461, 462, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/ or the like. In this way, after a number of hidden layers, input data received at the input layer 441 is transformed into rather different values indicative data characteristics corresponding to a task that the neural network structure has been designed to perform.

The output layer 443 is the final layer of the neural network structure. It produces the network's output or prediction based on the computations performed in the preceding layers (e.g., 441, 442). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the AI chat agent module 330 and/or one or more of its submodules 331-333 may comprise the transformative neural network structure of layers of neurons, and weights and activation functions describing the non-linear transformation at each neuron. Such a neural network structure is often implemented on one or more hardware processors 310, such as a graphics processing unit (GPU). An example neural network may be GPT-4o, GPT-3.5, and/or the like.

In one embodiment, the AI chat agent module 330 and its submodules 331-333 may comprise one or more LLMs built upon a Transformer architecture. For example, the Transformer architecture comprises multiple layers, each consisting of self-attention and feedforward neural networks. The self-attention layer transforms a set of input tokens (such as words) into different weights assigned to each token, capturing dependencies and relationships among tokens. The feedforward layers then transform the input tokens, based on the attention weights, represents a high-dimensional embedding of the tokens, capturing various linguistic features and relationships among the tokens. The self-attention and feedforward operations are iteratively performed through multiple layers of self-attention and feedforward layers, thereby generating an output based on the context of the input tokens. One forward pass for an input tokens to be processed through the multiple layers to generate an output in a Transformer architecture often entail hundreds of teraflops (trillions of floating-point operations) of computation.

For example, the Transformer-based architecture may process an input sequence of tokens (e.g., letters, symbols, numbers, signs, words, etc.) using its encoder-decoder architecture (for tasks such as machine translation, etc.) or just the encoder (for classification tasks) or decoder (for generation-only tasks). First, the input sequence may be tokenized and converted into embeddings, which are dense numerical representations, e.g., vectors of values. Positional encodings are added to these embeddings to provide information about the order of tokens.

The Transformer encoder, usually consisting of multiple layers, each of which may processes the input using a multi-head self-attention mechanism to capture relationships between tokens and a feed-forward network to transform the information, resulting in encoded representations of the input sequence of tokens.

For example, the multi-head self-attention mechanism at each Transformer layer within the Transformer encoder of an LLM may project input embeddings at the layer into three different embedding spaces using weight matrices, referred to as Query (Q) representing what a token wants to attend to, Key (K) representing what this token offers as information and Value (V) representing the actual information carried by the token. The Q, K, V matrices contain tunable weights of a Transformer-based language model that are updated during training. Then, the attention mechanism computes attention scores between all tokens in the input sequence using the Q K and V matrices. The resulting attention scores are then used to generate encoded representations of the input sequence of tokens.

Similarly, the Transformer decoder may comprise a symmetric structure with the encoder, consisting of multiple layers, each of which may comprise a multi-head self-attention mechanism. The decoder may start with a special start token and use the multi-head self-attention mechanism, augmented with encoder-decoder attention to focus on relevant parts of the decoder input. The decoder may generate output tokens one by one, with each step using the previously generated tokens as part of the input and updated attention weights. Finally, the decoder may comprise a linear layer and softmax function predict probabilities for the next token in the sequence, selecting the most likely one to continue the output. This process repeats until a special end token is generated or a length limit is reached.

The generated sequence of tokens may jointly represent an output. For example, a Transformer-based LLM (such as LLM 110*a*1, 110*a*2, 110*b*1, 110*b*2, 110*c*-110*f*) may receive a natural language input (such as a question) and generate a natural language output (such as an answer to the question).

In one embodiment, the AI chat agent module 330 and its submodules 331-333 may be implemented by hardware, software and/or a combination thereof. For example, the AI chat agent module 330 and its submodules 331-333 may comprise a specific neural network structure implemented and run on various hardware platforms 460, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 460 used to implement the neural network structure is specifically configured based on factors such as the complexity of the neural network, the scale of the tasks (e.g., training time, input data scale, size of training dataset, etc.), and the desired performance.

For example, to deploy the AI chat agent module 330 and its submodules 331-333 and/or any other neural network models such as LLM 110*a*1, 110*a*2, 110*b*1, 110*b*2, 110*c*-110*f* described in FIGS. 2A and 2B onto hardware platform 460, the neural network based modules 330 and its submodules 331-333 may be optimized for deployment by converting it to a suitable format, such as ONNX or TensorRT, to improve performance and compatibility. Next, depending on the size and workload requirements for modules 330 and its submodules 331-333, hardware types may be chosen for deployment, e.g., processing capacity, GPU memory size, and/or the like. Frameworks and drivers for the chosen hardware 460 frameworks and drivers may thus be installed, such as PyTorch, TensorFlow, or CUDA, to support the hardware platform 460. Then, weights and parameters of the AI chat agent module 330 and its submodules 331-333 may be loaded to the hardware 460. For large-scale deployments (e.g., with billions of weights for example), distributed computing frameworks may be used to handle model partitioning across multiple devices, e.g., hardware processors such as GPUs may be distributed on multiple devices, each handling a portion of weights of the model and therefore would undertake a portion of computational workload. In some embodiments, the AI chat agent module 330 and its submodules 331-333 may be deployed as a service, then they may be integrated with an API endpoint, using tools like Flask, FastAPI, or a cloud platform serverless services, and is accessible by a remote user via a network.

In another embodiment, some or all of layers 441, 442, 443 and/or neurons 442, 445, 446, and operations there between such as activations 461, 462, and/or the like, of the AI chat agent module 330 and its submodules 331-333 may be realized via one or more ASICs. For example, each neuron 442, 445 and 446 may be a hardware ASIC comprising a register, a microprocessor, and/or an input/output interface. For another example, operations among the neurons and layers may be implemented through an ASIC TPU. For yet another example, some operations among the neurons and layers such as a softmax operation, an activation function (such as a rectified linear unit (ReLU), sigmoid linear unit (SiLU), and/or the like) may be implemented by one or more ASICs.

For example, the AI chat agent module 330 may generate, by at least one ASIC (such as a TPU, etc.) performing a multiplicative and/or accumulative operation for a neural network language model, a next token based at least in prat on previously generated tokens, and in turn generate a natural language output representing the next-step action combining a sequence of generated tokens.

In one embodiment, the neural network based AI chat agent module 330 and one or more of its submodules 331-333 may be trained by iteratively updating the underlying parameters (e.g., weights 451, 452, etc., bias parameters and/or coefficients in the activation functions 461, 462 associated with neurons) of the neural network based on a loss. For example, during forward propagation, the training data such as a user query and document-indexing tree pairs are fed into the neural network. The data flows through the network's layers 441, 442, with each layer performing computations based on its weights, biases, and activation functions until the output layer 443 produces the network's output 350. In some embodiments, output layer 443 produces an intermediate output on which the network's output 350 is based.

The output generated by the output layer 443 is compared to the expected output (e.g., a "ground-truth" such as the corresponding correct response) from the training data, to compute a loss function that measures the discrepancy between the predicted output and the expected output. For example, the loss function may be cross entropy, MMSE, or a combination thereof. Given the loss, the negative gradient of the loss function is computed with respect to each weight of each layer individually. Such negative gradient is computed one layer at a time, iteratively backward from the last layer 443 to the input layer 441 of the neural network. These gradients quantify the sensitivity of the network's output to changes in the parameters. The chain rule of calculus is applied to efficiently calculate these gradients by propagating the gradients backward from the output layer 443 to the input layer 441.

In one embodiment, the neural network based AI chat agent module 330 and one or more of its submodules 331-333 may be trained using policy gradient methods, also referred to as "reinforcement learning" methods. For example, instead of computing a loss based on a training output generated via a forward propagation of training data, the "policy" of the neural network model, which is a mapping from an input of the current states or observations of an environment the neural network model is operated at, to an output of action. Specifically, at each time step, a reward is allocated to an output of action generated by the neural network model. The gradients of the expected cumulative reward with respect to the neural network parameters are estimated based on the output of action, the current states of observations of the environment, and/or the like. These gradients guide the update of the policy parameters using gradient descent methods like stochastic gradient descent (SGD) or Adam. In this way, as the "policy" parameters of the neural network model may be iteratively updated while generating an output action as time progresses, the boundaries between training and inference are often less distinct compared to supervised learning-in other words, backward propagation and forward propagation may occur for both "training" and "inference" stages of the neural network mode.

In some embodiments, AI chat agent module 330 and its submodules 331-333 may be housed at a centralized server (e.g., computing device 300) or one or more distributed servers. For example, one or more of AI chat agent module 330 and its submodules 331-333 may be housed at external server(s). The different modules may be communicatively coupled by building one or more connections through application programming interfaces (APIs) for each respective module. Additional network environment for the distributed servers hosting different modules and/or submodules may be discussed in FIG. 5.

During a backward pass, parameters of the neural network are updated backwardly from the last layer to the input layer (backpropagating) based on the computed negative gradient using an optimization algorithm to minimize the loss. The backpropagation from the last layer 443 to the input layer 441 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as generating a response to a user query.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

In some implementations, to improve the computational efficiency of training a neural network model, "training" a neural network model such as an LLM may sometimes be carried out by updating the input prompt, e.g., the instruction to teach an LLM how to perform a certain task. For example, while the parameters of the LLM may be frozen, a set of tunable prompt parameters and/or embeddings that are usually appended to an input to the LLM may be updated based on a training loss during a backward pass. For another example, instead of tuning any parameter during a backward pass, input prompts, instructions, or input formats may be updated to influence their output or behavior. Such prompt designs may range from simple keyword prompts to more sophisticated templates or examples tailored to specific tasks or domains.

In general, the training and/or finetuning of an LLM can be computationally extensive. For example, GPT-3 has 175 billion parameters, and a single forward pass using an input of a short sequence can involve hundreds of teraflops (trillions of floating-point operations) of computation. Training such a model requires immense computational resources, including powerful GPUs or TPUs and significant memory capacity. Additionally, during training, multiple forward and backward passes through the network are performed for each batch of data (e.g., thousands of training samples), further adding to the computational load.

In general, the training process transforms the neural network into an "updated" trained neural network with updated parameters such as weights, activation functions, and biases. The trained neural network thus improves neural network technology in AI chatbots.

Figure 5:
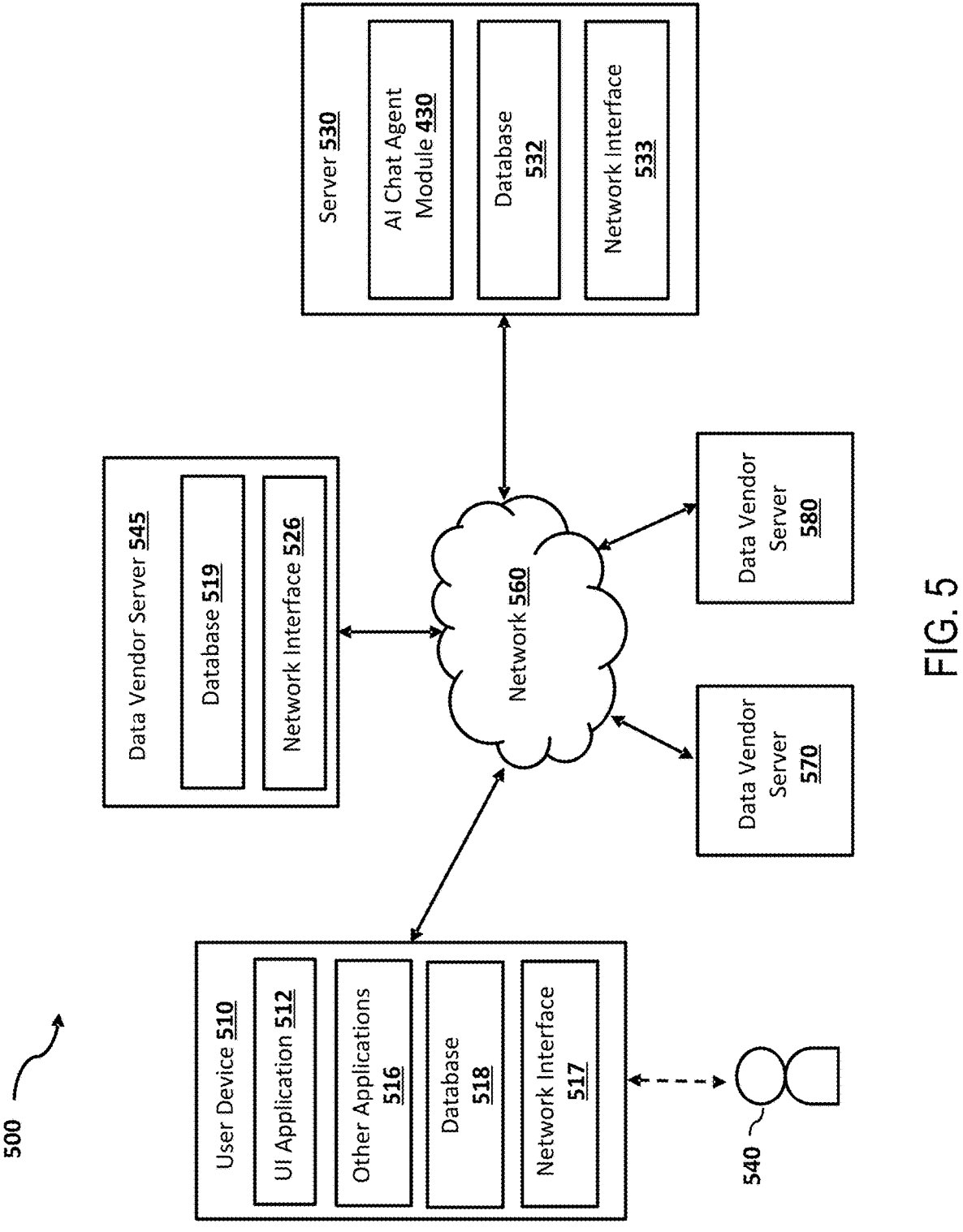
FIG. 5 is a simplified block diagram of a networked system suitable for implementing the retrieval augmented generation LLM framework described in FIGS. 1, 2A-2D, 3, 4, and other embodiments described herein.

FIG. 5 is a simplified block diagram of a networked system 500 suitable for implementing the RAG LLM framework described in FIGS. 1, 2A-2D, 3, and 4 and other embodiments described herein. In one embodiment, system 500 includes the user device 510 which may be operated by user 540, data vendor servers 545, 570 and 580, server 530, and other forms of devices, servers, and/or software components that operate to perform various methodologies in accordance with the described embodiments. Exemplary devices and servers may include device, stand-alone, and enterprise-class servers which may be similar to the computing device 300 described in FIG. 3, operating an OS such as a MICROSOFT® OS, a UNIX® OS, a LINUX® OS, or other suitable device and/or server-based OS. It can be appreciated that the devices and/or servers illustrated in FIG. 5 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 510, data vendor servers 545, 570 and 580, and the server 530 may communicate with each other over a network 560. User device 510 may be utilized by a user 540 (e.g., a driver, a system admin, etc.) to access the various features available for user device 510, which may include processes and/or applications associated with the server 530 to receive an output data anomaly report.

User device 510, data vendor server 545, and the server 530 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 500, and/or accessible over network 560.

User device 510 may be implemented as a communication device that may utilize appropriate hardware and software configured for wired and/or wireless communication with data vendor server 545 and/or the server 530. For example, in one embodiment, user device 510 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 510 of FIG. 5 contains a user interface (UI) application 512, and/or other applications 516, which may correspond to executable processes, procedures, and/or applications with associated hardware. For example, the user device 510 may receive a message indicating a response to a user query from the server 530 and display the message via the UI application 512. In other embodiments, user device 510 may include additional or different modules having specialized hardware and/or software as required.

In one embodiment, UI application 512 may communicatively and interactively generate a UI for an AI agent implemented through the AI chat agent module 330 (e.g., an LLM agent) at server 530. In at least one embodiment, a user operating user device 510 may enter a user utterance, e.g., via text or audio input, such as a question, uploading a document, and/or the like via the UI application 512. Such user utterance may be sent to server 530, at which AI chat agent module 330 may generate a response via the process described in FIGS. 2A-2D. The AI chat agent module 330 may thus cause a display of response (e.g., "Nicholas Bacon") to a user query (e.g., "Who is the father of the artist who painted Head I") at UI application 512 and interactively update the display in real time with the user utterance.

In various embodiments, user device 510 includes other applications 516 as may be desired in particular embodiments to provide features to user device 510. For example, other applications 516 may include security applications for implementing client-side security features, programmatic client applications for interfacing with appropriate application programming interfaces (APIs) over network 560, or other types of applications. Other applications 516 may also include communication applications, such as email, texting, voice, social networking, and IM applications that allow a user to send and receive emails, calls, texts, and other notifications through network 560. For example, the other application 516 may be an email or instant messaging application that receives a prediction result message from the server 530. Other applications 516 may include device interfaces and other display modules that may receive input and/or output information. For example, other applications 516 may contain software programs for asset management, executable by a processor, including a graphical user interface (GUI) configured to provide an interface to the user 540 to view the response to the user query.

User device 510 may further include database 518 stored in a transitory and/or non-transitory memory of user device 510, which may store various applications and data and be utilized during execution of various modules of user device 510. Database 518 may store user profile relating to the user 540, predictions previously viewed or saved by the user 540, historical data received from the server 530, and/or the like. In some embodiments, database 518 may be local to user device 510. However, in other embodiments, database 518 may be external to user device 510 and accessible by user device 510, including cloud storage systems and/or databases that are accessible over network 560.

User device 510 includes at least one network interface component 517 adapted to communicate with data vendor server 545 and/or the server 530. In various embodiments, network interface component 517 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 545 may correspond to a server that hosts database 519 to provide training datasets including a user query, and/or document-indexing tree pairs to the server 530. The database 519 may be implemented by one or more relational database, distributed databases, cloud databases, and/or the like.

The data vendor server 545 includes at least one network interface component 526 adapted to communicate with user device 510 and/or the server 530. In various embodiments, network interface component 526 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 545 may send asset information from the database 519, via the network interface 526, to the server 530.

The server 530 may be housed with the AI chat agent module 330 and its submodules described in FIG. 3. In some implementations, AI chat agent module 330 may receive data from database 519 at the data vendor server 545 via the network 560 to generate a response. The generated response may also be sent to the user device 510 for review by the user 540 via the network 560.

The database 532 may be stored in a transitory and/or non-transitory memory of the server 530. In one implementation, the database 532 may store data obtained from the data vendor server 545. In one implementation, the database 532 may store parameters of the AI chat agent module 330. In one implementation, the database 532 may store previously generated responses, and the corresponding input feature vectors.

In some embodiments, database 532 may be local to server 530. However, in other embodiments, database 532 may be external to the server 530 and accessible by the server 530, including cloud storage systems and/or databases that are accessible over network 560.

The server 530 includes at least one network interface component 533 adapted to communicate with user device 510 and/or data vendor servers 545, 570 or 580 over network 560. In various embodiments, network interface component

533 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 560 may be implemented as a single network or a combination of multiple networks. For example, in various embodiments, network 560 may include the Internet or one or more intranets, landline networks, wireless networks, and/or other appropriate types of networks. Thus, network 560 may correspond to small scale communication networks, such as a private or local area network, or a larger scale network, such as a wide area network or the Internet, accessible by the various components of system 500.

Example Work Flows

FIG. 6 is an example logic flow diagram illustrating a method of building an AI conversation agent using an indexing tree based on the framework shown in FIGS. 1, 2A-2D, 3, 4, and 5, according to some embodiments described herein. One or more of the processes of method 600 may be implemented, at least in part, in the form of executable code stored on non-transitory, tangible, machine-readable media that when run by one or more processors may cause the one or more processors to perform one or more of the processes. In some embodiments, method 600 corresponds to the operation of the AI chat agent module 330 (e.g., FIGS. 3 and 5) that performs training and building an AI conversation agent.

In some embodiments, method 600 is performed by a system such as computing device 300, user device 510, server 530, or another device or combination of devices. Inputs (e.g., a user query) may be received via a data interface such as data interface 315, network interface 517, network interface 533, or via a data interface that is integrated with a device. For example, UI Application 512 may receive user inputs via a text input interface (e.g., keyboard), audio input (e.g., microphone), video interface (e.g., camera), or other interface for receiving user inputs (e.g., a mouse or touch display).

As illustrated, the method 600 includes a number of enumerated steps, but aspects of the method 600 may include additional steps before, after, and in between the enumerated steps. In some aspects, one or more of the enumerated steps may be omitted or performed in a different order.

At step 602, an indexing tree is constructed by one or more neural network based language models. The indexing tree reflects sematic relationship among textual contexts of one or more documents. The indexing tree comprises at least a first level of nodes representing a plurality of propositions indicating facts about at least one entity from the one or more documents, a second level of nodes representing a plurality of proposition aggregates that aggregate one or more first-level propositions mentioning a same entity, and a third level of nodes representing a plurality of summaries that summarize one or more second-level proposition aggregates.

In some embodiment, the constructing the indexing tree (e.g., 211, 213) includes dividing or rewriting the one or more documents into a plurality of segments; and extracting a plurality of entities and the plurality of propositions each relating to one or more entities from the plurality of segments.

In one embodiment, constructing the indexing tree (e.g., 211, 213) further comprises: determining a first proposition and a second proposition on the first level relate to the same entity; generating a first proposition aggregate based on the first proposition and the second proposition; and adding a second-level parent node that is linked to two child nodes of the first proposition and the second proposition on the first level. In some embodiments, the constructing of the indexing tree (e.g., 211, 213) further includes: generating a summary of the one or more second-level proposition aggregates that are clustered based on similarity; and adding a third-level parent node of the summary linking to nodes representing the one or more second-level proposition aggregates.

In some embodiments, the constructing of the indexing tree (e.g., 213) further includes generating a summary of the one or more second-level proposition aggregates and one or more segments that are clustered based on similarity.

At step 604, the user query (e.g., 106) is received via a communication interface.

At step 606, one or more nodes are retrieved from the indexing tree across multiple levels based on similarity comparison with the user query based at least on a similarity between embeddings of the one or more nodes and an embedding of the user query. For example, the retrieval may be performed via tree traversal on the indexing tree, e.g., retrieving, from the indexing tree, one or more summaries from the third level based on similarity comparison of the one or more summaries and the query embedding; iteratively selecting, for each summary, one or more child nodes of the respective summary on the indexing tree based on similarity comparison of the respective child nodes and the query embedding; traversing the index tree from a top level to lower levels until the second level of proposition aggregates, and concatenating all retrieved nodes to form the context.

In some embodiments, the retrieving is done via a collapsed tree traversal, e.g., retrieving, from a set of all summaries and proposition aggregates in the indexing tree, one or more summaries and/or proposition aggregates subject to a threshold number of tokens based on a similarity comparison between the set of all summaries and proposition aggregates, and an embedding of the user query, respectively. The set of all summaries and proposition aggregates in the indexing tree is obtained by flattening the indexing tree into a single layer.

At step 608, a response in response to the user query is generated by the neural network based language model, based on a context combining at least summaries and/or proposition aggregates corresponding to the retrieved one or more nodes.

At step 610, the response is caused to be displayed at a visualized user interface of the AI agent.

In some embodiments, method 600 is applicable in a variety of applications. For example, the task request 106 received by a neural network model (e.g., GPT-4o) may relate to a diagnostic request in view of a medical record in a healthcare system, a curriculum designing request in an online education system, a code generation request in a software development system, a writing and/or editing request in a content generation system, an IT diagnostic request in an IT customer service support system, a navigation request in a robotic and autonomous system, and/or the like. By performing method 600, the neural network based artificial agent may improve technology in the respective technical field in healthcare and diagnostics, education and personalized learning, software development and code assistance, content creation, autonomous system (such as autonomous driving, etc.), and/or the like.

For another example, when the task query includes a query to identify an information technology (IT) anomaly relating to a usage of an IT component such as a network gateway, a router, an online printer, and/or the like, by performing method 600 at an environment of a local area network (LAN), the neural network based artificial agent may receive an observation from the environment at which the next-step action is executed, and determine that the observation representing an information technology anomaly (e.g., a router failure, an unauthorized access attempt, a domain name system anomaly, and/or the like). Method 600 and embodiments described herein of constructing the indexing tree based on similarity and relatedness improves accuracy and efficiency in retrieving relevant information in a vast amount of IT support documents. Thus, network anomaly may be identified in an efficient manner. In some implementations, the neural network based artificial agent may cause an alert relating to the information technology anomaly to be displayed at a visualized user interface. In this way, IT anomalies may be detected and alerted using the neural network based artificial agent in an efficient manner so as to improve network support technology.

Example Results

FIGS. 7A-7G represent exemplary test results using embodiments described herein.

SiReRAG, a RAG indexing framework (e.g., 200 and/or 201) guided by similarity and relatedness. As shown in FIGS. 2A, 2B and 2C, Similarity Tree integrates information based on similarity while Relatedness Tree and/or Similarity-Relatedness Tree integrates information based on relatedness. As a first step, an alternative tree design is studied to determine whether a generalized tree structure for similarity and relatedness trees, and beyond can be developed. After the construction of the similarity tree, propositions and their entities are extracted from the multihop reasoning dataset and clustering is performed based on entities to synthesize related information. Indexing separate similarity and relatedness trees, SiReRAG explicitly models both kinds of information within our dataset.

A hierarchical structure of trees is explored. For efficiency, this application may stick to a tree structure to organize texts and explore whether a more structured tree design would offer performance improvement. RAPTOR (Parth Sarthi, Salman Abdullah, Aditi Tuli, Shubh Khanna, Anna Goldie, and Christopher D Manning, Raptor: Recursive abstractive processing for tree-organized retrieval. arXiv preprint arXiv: 2401.18059, 2024.) placed all text chunks at the bottom level and recursive summaries at upper levels, but this design does not closely follow the common-sense FIG. 7A: QA performance of having hierarchical text chunks on the validation set of QUALITY. Due to randomization of clustering and generation temperature of LLMs, each indexing method was run for 5 times and compute their average and standard deviation of accuracies.

Zhang (Jun Zhang, Adrian Silvescu, and Vasant Honavar, *Ontology-driven induction of decision trees at multiple levels of abstraction*, In Abstraction, *Reformulation, and Approximation: 5th International Symposium, SARA* 2002 Kananaskis, Alberta, Canada Aug. 2-4, 2002 Proceedings 5, pp. 316-323. Springer, 2002) provides a definition of a tree, where multiple levels of data abstraction are provided. The reason is that different text chunks of a document may showcase different levels of abstraction, which serves as the assumption of many document discourse trees (Aru Maekawa, Tsutomu Hirao, Hidetaka Kamigaito, and Manabu Okumura, *Can we obtain significant success in RST discourse parsing by using large language models?* In Yvette Graham and Matthew Purver (eds.), *Proceedings of the 18th Conference of the European Chapter of the Association for Computational Linguistics (Volume 1: Long Papers)*, pp. 2803-2815, St. Julian's, Malta, March 2024. Association for Computational Linguistics. URL https://aclanthology.org/2024.eacl-long.171; Zhengyuan Liu, Ke Shi, and Nancy F Chen, *Dmrst: A joint framework for document-level multilingual rst discourse segmentation and parsing*, arXiv preprint arXiv: 2110.04518, 2021). For example, text chunks of the introduction section of a research paper are more likely to be more abstractive than those from the methodology section. Therefore placing different text chunks on different levels of a tree is first explored based on their levels of abstractiveness.

For this analysis, QUALITY dataset (Richard Yuanzhe Pang, Alicia Parrish, Nitish Joshi, Nikita Nangia, Jason Phang, Angelica Chen, Vishakh Padmakumar, Johnny Ma, Jana Thompson, He He, and Samuel Bowman, *QuALITY: Question answering with long input texts, yes*! In Marine Carpuat, Marie-Catherine de Marneffe, and Ivan Vladimir Meza Ruiz (eds.), *Proceedings of the 2022 Conference of the North American Chapter of the Association for Computational Linguistics: Human Language Technologies*, pp. 5336-5358, Seattle, United States, July 2022. Association for Computational Linguistics.) was chosen instead of multihop reasoning ones, because the documents of QUALITY are longer, resulting in more text chunks than using the other datasets. GPT-4o is prompted to identify a two-level hierarchy for all candidate chunks: low (text chunks describing fine-grained details about a topic) and high (text chunks giving an overview of a topic and summarizing fine-rained details) abstractiveness. Summary nodes will still start from the second level (the level above the bottom level), so the second will contain both summary nodes (of the low-abstractive chunks) and high-abstractive chunks. Using the same text chunks across two methods, RAPTOR is compared against our hierarchical design. Since the top 1 relevant nodes are simply retrieved via an embedding model (text-embedding-3-small) when a query arrives, the idea of hierarchical structure of chunks would affect summary nodes due to the differences of their children.

Information is synthesized based on relatedness. For relatedness, information is synthesized based on a different philosophy than RAPTOR. Because related information pieces always share some degree of connection (e.g., overlapping subjects), it is assumed that two text pieces are related if they mention the same entity (e.g., person, location, product, etc.).

Relatedness is modeled with entity-specific propositions. To effectively use entities for organizing related content, to determine the appropriate granularity for text pieces is first needed. There are three main limitations with directly connecting entities to standard text chunks. First, a chunk often contains information beyond the scope of a specific entity, making it challenging to localize information about one entity, potentially adding noise. Second, aggregating all chunks in an indexing corpus for each entity can result in hundreds of thousands of tokens for each entity, which may lead to long context performance issues, such as losing critical information in the middle Liu et al. (Nelson F Liu, Kevin Lin, John Hewitt, Ashwin Paranjape, Michele Bevilacqua, Fabio Petroni, and Percy Liang, *Lost in the middle: How language models use long contexts. Transactions of the Association for Computational Linguistics,* 12:157-173, 2024) or experiencing low coverage and citation performance Laban et al. (Philippe Laban, Alexander R Fabbri, Caiming Xiong, and Chien-Sheng Wu, *Summary of a hay-*

*stack: A challenge to long-context llms and rag systems.* arXiv preprint arXiv: 2407.01370, 2024). Third, linking with chunks will introduce redundancy as each chunk may be a part of multiple entity clusters. Therefore, inspired by recent works on retrieval granularity (Yixin Liu, Alexander R Fabbri, Yilun Zhao, Pengfei Liu, Shafiq Joty, Chien-Sheng Wu, Caiming Xiong, and Dragomir Radev, *Towards interpretable and efficient automatic reference-based summarization evaluation*, arXiv preprint arXiv: 2303.03608, 2023; Tong Chen, Hongwei Wang, Sihao Chen, Wenhao Yu, Kaixin Ma, Xinran Zhao, Dong Yu, and Hongming Zhang, *Dense x retrieval: What retrieval granularity should we use*? arXiv preprint arXiv: 2312.06648, 2023), to use short entity-specific "propositions" to represent fine-grained knowledge about entities is proposed and used to build the relatedness tree.

FIG. 7B (I) shows the key statistics for extracted propositions and entities from MuSiQue, 2Wiki. and HotpotQA datasets. The number of chunks, propositions, entities, proposition aggregates, and the average, maximum, and minimum number of propositions per entity are shown across the three datasets.

Propositions and entities are extracted from the documents. A proposition is defined as "a factual statement describing important information (preferably about some entities) from a paragraph". entities and propositions are extracted using the Distill-SynthKG pipeline (Prafulla Kumar Choubey, Xin Su, Man Luo, Xiangyu Peng, Caiming Xiong, Tiep Le, Shachar Rosenman, Vasudev Lal, Phil Mui, Ricky Ho, Phillip Howard, and Chien-Sheng Wu, *Distill-synthkg: Distilling knowledge graph synthesis workflow for improved coverage and efficiency,* 2024. URL https://arxiv.org/abs/2310.16597), adapting its SynthKG workflow. Specifically, chunks of documents taken from 10K BAAI/IndustryCorpus documents are first rewritten to resolve entity references. Here Meta-Llama-3-70B-Instruct (AI@Meta, 2024) is used, and the LLM prompt of rewriting chunks is used. Then, after we obtain entities from these rewritten chunks, we extract all relevant propositions and their associated entities (using the same LLM) as detailed in the LLM prompt as previously shown. Finally, all propositions and entities are consolidated as the training data to fine-tune Mistral-7B-Instruct-v0.3 (Albert Q. Jiang, Alexandre Sablayrolles, Arthur Mensch, Chris Bamford, Devendra Singh Chap-lot, Diego de las Casas, Florian Bressand, Gianna Lengyel, Guillaume Lample, Lucile Saulnier, Lelio Renard Lavaud, Marie-Anne Lachaux, Pierre Stock, Teven Le Scao, Thibaut Lavril, Thomas Wang, Timothée Lacroix, and William El Sayed. Mistral 7b, 2023. URL https://arxiv.org/abs/2310.06825). This smaller fine-tuned model is used to extract propositions and their associated entities from our multihop datasets.

The prompt for extracting propositions and entities does not require every proposition to have associated entities. When LLMs are prompted to generate entities for each proposition, they sometimes produce common nouns as entities for those propositions that lack actually associated entities. This can lead to the clustering of unrelated propositions based on common nouns, potentially introducing noise into the relatedness tree. For example, as illustrated in FIG. 7B (II), it is preferred to avoid LLMs generating Drug as an entity for proposition 1 due to its ambiguity. Subsequently, propositions without associated entities are excluded when constructing the relatedness tree, ensuring that only high-quality, entity-linked propositions are utilized. FIG. 7B (I) provides a detailed breakdown of key statistics for extracted propositions and entities from the MuSiQue, 2Wiki, and HotpotQA datasets.

Related propositions that share the same entity are concatenated using exact match to form proposition aggregates. It is ensured that all propositions from the same document are grouped together and maintain their original order. By treating these proposition aggregates as pseudo-documents, the same clustering pipeline in RAPTOR is applied to obtain recursive summaries at levels above them and build the relatedness tree. Given that most propositions involve multiple entities, each proposition is associated with several entity clusters, offering two key advantages. First, it effectively mimics soft clustering as a single proposition may belong to multiple aggregates. Secondly, when constructing recursive summaries within the RAPTOR framework, the shared propositions across different aggregates result in high embedding similarity, ensuring that these aggregates remain clustered together even at higher levels in the tree. This relatedness tree forms the right part of SiReRAG as shown in FIGS. 2A, 2B, and 2C. Note that only index aggregated propositions instead of individual propositions are indexed for better inference efficiency.

To construct similarity and relatedness trees independently is proposed. This approach ensures that summary nodes in one tree do not access the clusters of the other, leading to a simpler design. There is another slightly complex design in which we allow summary nodes from one tree to access clusters from the other tree. This interaction may enable summary nodes in both trees to inform and enhance each other and improving their informativeness and consequently performance. However, this approach sacrifices the distinction between similarity and relatedness. Additionally, allowing cross-tree interaction leads to more nodes to cluster at each level as well as requires summarization based on a greater number of nodes per cluster, all of which increases the overall complexity of the system.

In some embodiments, all tree nodes are flatten to be placed into a unified retrieval pool. In other words, regardless of a node's origin (e.g., bottom or upper levels, similarity or relatedness trees), it is added to a single list containing all nodes.

To demonstrate the effectiveness of SiReRAG, three representative multihop QA datasets: MuSiQue (Harsh Trivedi, Niranjan Balasubramanian, Tushar Khot, and Ashish Sabharwal, *Musique: Multi-hop questions via single-hop question composition*, 2022), 2WikiMultiHopQA (Xanh Ho, Anh-Khoa Duong Nguyen, Saku Sugawara, and Akiko Aizawa. *Constructing a multi-hop QA dataset for comprehensive evaluation of reasoning steps*. In Donia Scott, Nuria Bel, and Chengqing Zong (eds.), *Proceedings of the 28th International Conference on Computational Linguistics*, pp. 6609-6625, Barcelona, Spain (Online), December 2020. International Committee on Computational Linguistics.), and HotpotQA (Zhilin Yang, Peng Qi, Saizheng Zhang, Yoshua Bengio, William Cohen, Ruslan Salakhutdinov, and Christopher D. Manning, *HotpotQA: A dataset for diverse, explainable multi-hop question answering*, In Ellen Riloff, David Chiang, Julia Hockenmaier, and Jun'ichi Tsujii (eds.), *Proceedings of the 2018 Conference on Empirical Methods in Natural Language Processing*, pp. 2369-2380, Brussels, Belgium, October-November 2018) are selected. Using the same corpus as HippoRAG (Bernal Jiménez Gutiérrez, Yiheng Shu, Yu Gu, Michihiro Yasunaga, and Yu Su, *Hipporag: Neurobiologically inspired long-term memory for large language models*, arXiv preprint arXiv: 2405.14831, 2024), 1000 questions are obtained from each validation set of these three datasets.

RAPTOR, HippoRAG, and GraphRAG are selected as state-of-the-art retrieval baselines. As discussed above, RAPTOR integrates knowledge based on similarity while the other two approaches focus on relatedness. Specifically, HippoRAG has both indexing and retrieval components, and ColBERTv2 (Keshav Santhanam, Omar Khattab, Jon Saad-Falcon, Christopher Potts, and Matei Zaharia, *Col-BERTv2: Effective and efficient retrieval via lightweight late interaction*, In Marine Carpuat, Marie-Catherine de Marneffe, and Ivan Vladimir Meza Ruiz (eds.), *Proceedings of the 2022 Conference of the North American Chapter of the Association for Computational Linguistics: Human Language Technologies*, pp. 3715-3734, Seattle, United States, July 2022.) is used as the retriever of HippoRAG due to its strongest QA performance reported. Although GraphRAG has a different goal (global questions directed at an entire dataset) than the dataset of the present disclosure, it is included to show its performance on multihop QA datasets. Since the queries in the datasets of the present disclosure ask fine-grained details, the local search function of GraphRAG is used instead of its global search.

Exact match (EM) and FI scores are used to measure the QA performance of different models. Both metrics evaluate how accurate a generated answer is with respect to the ground truth. Like RAPTOR (Parth Sarthi, Salman Abdullah, Aditi Tuli, Shubh Khanna, Anna Goldie, and Christopher D Manning, *Raptor: Recursive abstractive processing for tree-organized retrieval*, arXiv preprint arXiv: 2401.18059, 2024), retrieval performance is not accessed directly. The reason is that both SiReRAG and RAPTOR create new candidates (e.g., summary and proposition aggregate) in the retrieval pool, so it would be unfair to compare methods in terms of retrieval scores across different pools. Instead, QA performance is the best indicator of the overall capability of both RAG pipelines.

The average time per query (TPQ) and the time-pool efficiency ratio (TPER) are used to measure the efficiency of SiReRAG and RAPTOR, as both methods share a significant portion of their retrieval candidates. Average TPQ measures the average time (in seconds) taken to answer a query, and it represents the inference time of a method. For TPER, it computes the growth of total inference time with respect to the growth of the retrieval pool size between two methods:

$$TPER = \frac{\text{Inference-Time } A - \text{Inference-Time } B}{\text{Pool-Size } A - \text{Pool-Size } B} \qquad (1)$$

Setting SiReRAG as method A and a baseline as method B, this application aims to ensure that the growth of inference time does not scale proportionally with the increase in the retrieval pool size. The reason behind is that there are many efficiency considerations (e.g., length and redundancy of retrieval candidates) beyond just the sheer number of retrieval candidates. Parallelization could also be designed to retrieve candidates simultaneously from similarity and relatedness trees, thereby minimizing the effect of retrieval pool size. A TPER value less than 1 indicates reasonable efficiency, whereas a TPER value greater than 1 signifies low efficiency.

To generate final answer, GPT-4o and the same prompt ("answer this question in as fewer number of words as possible.") are used to answer queries for all methods, since the application aims to control the instruction-following capabilities across all methods. Either GPT-3.5-Turbo or GPT-4o are used as the choice of LLM if any methods involve LLM calls. OpenAI's text—embedding-3—small are used as the embedding model for all methods. During retrieval, top 20 candidates that match the provided query for all methods are selected, because there is a large number of text chunks in the datasets and SᵢReRAG is expected to perform better when retrieving more due to the incorporation of proposition aggregates and their recursive summaries.

The results and analysis aim to answer the following research questions are as follows:

RQ 1: How does SᵢReRAG compare against other state-of-the-art baselines?

RQ 2: As an important contribution of SᵢReRAG, is considering both similarity and relatedness an effective method?

RQ 3: What is the effect of each component in SᵢReRAG?

RQ 4: What is the applicability of SᵢReRAG?

RQ 5: With the addition of relatedness tree, is SᵢReRAG an efficient method?

The overall results are presented in FIG. 7C. The results are shown on more datasets (single-hop QA, other multihop QA, and ambiguous questions to show the generality of SᵢReRAG across various complex reasoning tasks.

SᵢReRAG delivers consistent improvement over RAPTOR, HippoRAG, and GraphRAG. With an exception on 2Wiki when comparing against HippoRAG, SᵢReRAG achieves significantly higher performance than indexing baselines (e.g., approximately 5% higher than RAPTOR on average FI, up to 8.3% improvement of FI on MuSiQue than HippoRAG, and more than 20% higher than GraphRAG on average EM and FI). This demonstrates the advantage of SᵢReRAG on multihop QA and modeling both similarity and relatedness. Specifically, SᵢReRAG outperforms RAPTOR due to the incorporation of a relatedness tree, and it has better overall performance than HippoRAG, because similarity is explicitly modeled while HippoRAG prioritizes relatedness signals such as nodes with the most edges. It is seen that HippoRAG is particularly strong on 2Wiki benchmark, which is also reported in its original paper. Thus, it is believed 2Wiki is the best fit of HippoRAG, but it has lower performance scores than SᵢReRAG on other datasets.

One potential reason is that the entity-centric design of 2Wiki may be well-suited for HippoRAG, as noted in the HippoRAG paper.

As for GraphRAG, it considers relatedness solely, and it delivers the worst performance scores on our datasets. After a manual verification, it is found that GraphRAG often provides "I don't know" answers, suggesting that it prefers not to give a concrete answer. Since GraphRAG is designed to handle query-focused Summarization of an entire corpus, it is not a competitive method in terms of accuracy for existing multihop QA tasks.

When comparing the performance of SᵢReRAG using GPT-4o as the LLM against itself using GPT-3.5-Turbo. It is found that the QA performance is not significantly affected. This phenomenon also holds on RAPTOR. Since the choice of LLM for SᵢReRAG and RAPTOR only affects summarization results, it is believed GPT-3.5-Turbo is a sufficiently good option for both methods. This allows researchers to pursue a more cost-effective solution with SᵢReRAG for indexing.

To dissect SᵢReRAG, a comprehensive ablation analysis is performed as shown in FIG. 7D. There are several variances, including (A) remove the recursive summary on the relatedness tree; (B) add all the propositions into the retrieval pool, and keep all aggregated propositions and recursive summary on the relatedness tree; (C) same as (B) but remove aggregated propositions; (D) same as (C) but further remove the recursive summary design on the relatedness tree.

Entity clustering is used. In (E), a separate relatedness tree is not maintained and an additional clustering philosophy is added to the similarity tree. Specifically, each text chunk in the similarity tree is simplified to, 'This chunk mentions entity 1 and entity 2,' if both entities are extracted by our LLM. GMMs (the same clustering method as RAPTOR) are run on these simplified chunks. Once the clustering decisions are obtained, the original chunks are grouped as additional clusters and append these clusters to the similarity tree, allowing higher levels of the tree to incorporate both clustering philosophies. Since entities primarily determine the outcome of this additional clustering approach, entity clustering is applied to model relatedness on the similarity tree. This allows the framework to eliminate proposition aggregates in order to examine their utility.

Findings are below. Overall, it is observed that performance drops across all variations, highlighting the effectiveness of the design for SᵢReRAG. First, the recursive summary on the relatedness tree proves beneficial, as seen in both (A) and (D). Interestingly, adding more propositions to retrieval negatively impacts performance, as shown in (B). This indicates adding redundant information into the retrieval pool hurts the QA performance, the aggregated propositions in SᵢReRAG is kept. From (C), also it is found that aggregated propositions are essential, with their removal resulting in a significant performance decline. This is an important indicator that adding grouped knowledge about relatedness to the similarity tree would offer improvements.

Both (A) and (B) have better performance than RAPTOR (GPT-4o) from FIG. 7C, which indicates the advantage of proposition aggregates. In contrast, although (E) also models both similarity and relatedness, it exhibits a notable decline comparing against SᵢReRAG. This finding demonstrates the necessity of proposition aggregates of modeling relatedness. Because proposition aggregates reduce noise and information redundancy more effectively than text chunks, they serve as an effective carrier of related dataset contents.

FIG. 7E shows applicability of SᵢReRAG when a specific retrieval method is selected. The non-indexing models are fed with the retrieval pool of SᵢReRAG and see whether QA performance improves.

FIG. 7F shows efficiency of SᵢReRAG and RAPTOR. Since both methods share a significant portion of retrieval candidates, SᵢReRAG is designated as Method A and RAPTOR as Method B in the TPER columns, as defined in Equation 1.

How applicable SᵢReRAG is when a specific retrieval method is chosen, is analyzed. Therefore, BM25 (Stephen E Robertson and Steve Walker. Some simple effective approximations to the 2-poisson model for probabilistic weighted retrieval. In *SIGIR '94: Proceedings of the Seventeenth Annual International ACM-SIGIR Conference on Research and Development in Information Retrieval*, organised by Dublin City University, pp. 232-241. Springer, 1994) and ColBERTv2 (Keshav Santhanam, Omar Khattab, Jon Saad-Falcon, Christopher Potts, and Matei Zaharia, *Col-BERTv2: Effective and efficient retrieval via lightweight late interaction*, In Marine Carpuat, Marie-Catherine de Marneffe, and Ivan Vladimir Meza Ruiz (eds.), *Proceedings of the 2022 Conference of the North American Chapter of the Association for Computational Linguistics: Human Language Technologies*, pp. 3715-3734, Seattle, United States, July 2022) are selected as additional reranking-based options. They may be run on the retrieval pool of SᵢReRAG to demonstrate its utility. It is shown how SiReRAG can complement these non-indexing options in FIG. 7E. Results show that having SiReRAG benefits both BM25 and ColBERTv2 significantly, which demonstrates the advantage of our solution as the upstream step of these methods. On the other hand, RAPTOR only improves the QA performance on MiSuQue while showing performance degradation on other datasets. Thus, the utility of SiReRAG surpasses that of RAPTOR in the context of multihop reasoning. SiReRAG is also applied on an interactive retrieval method called self-ask (Ofir Press, Mum Zhang, Sewon Min, Ludwig Schmidt, Noah Smith, and Mike Lewis, *Measuring and narrowing the compositionality gap in language models*, In Houda Bouamor, Juan Pino, and Kalika Bali (eds.), Findings of the Association for Computational Linguistics: EMNLP 2023, pp. 5687-5711, Singapore, December 2023.) and obtain significant performance improvement. The method of the present disclosure showcases wide applicability on multihop QA across various retrieval methods.

As shown in FIG. 7F, the efficiency of SiReRAG and RAPTOR are compared using the metrics described. All the values listed involve the time taken to retrieve the top 20 candidates and prompt GPT-4o to answer the query.

RAPTOR requires less inference time than SiReRAG on average, which is expected due to SiReRAG's larger retrieval pool. However, with slightly longer inference time, SiReRAG has much better performance as discussed previously. To evaluate whether SiReRAG remains a reasonably efficient method, its TPER values are computed to measure its growth of total inference time relative to its growth of retrieval pool size. Since all its TPER values are well below 1, SiReRAG demonstrates reasonable efficiency without introducing many lengthy or redundant retrieval candidates.

In this disclosure, the bottleneck of solely modeling similarity or relatedness is identified when a multihop reasoning dataset needs to be indexed for knowledge integration. To address it, SiReRAG is introduced. An innovative RAG indexing approach that considers both similarity and relatedness. SiReRAG delivers a consistent improvement over state-of-the-art indexing baselines across several multihop QA benchmarks.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of retrieval-augmented text generation to generate a response to a user query by an artificial intelligence (AI) agent, the method comprising:

constructing, by one or more neural network based language models, an indexing tree reflecting sematic relationship among textual contexts of one or more documents, wherein the indexing tree comprises at least a first level of nodes representing a plurality of propositions indicating facts about at least one entity from the one or more documents, a second level of nodes representing a plurality of proposition aggregates that aggregate one or more first-level propositions mentioning a same entity, and a third level of nodes representing a plurality of summaries that summarize one or more second-level proposition aggregates;

receiving, via a communication interface, the user query;

retrieving, from the indexing tree, one or more nodes across multiple levels based on similarity comparison with the user query based at least on a similarity between embeddings of the one or more nodes and an embedding of the user query;

generating, by the neural network based language model, a response in response to the user query based on a context combining at least summaries and/or proposition aggregates corresponding to the retrieved one or more nodes; and causing the response to be displayed at a visualized user interface of the AI agent.

2. The method of claim 1, wherein the constructing the indexing tree comprises:

dividing or rewriting the one or more documents into a plurality of segments; and extracting a plurality of entities and the plurality of propositions each relating to one or more entities from the plurality of segments.

3. The method of claim 2, wherein the constructing of the indexing tree further comprises:

determining a first proposition and a second proposition on the first level relate to the same entity;

generating a first proposition aggregate based on the first proposition and the second proposition; and adding a second-level parent node that is linked to two child nodes of the first proposition and the second proposition on the first level.

4. The method of claim 3, wherein the constructing of the indexing tree further comprises:

generating a summary of the one or more second-level proposition aggregates that are clustered based on similarity; and adding a third-level parent node of the summary linking to nodes representing the one or more second-level proposition aggregates.

5. The method of claim 3, wherein the constructing of the indexing tree further comprises:

generating a summary of the one or more second-level proposition aggregates and one or more segments that are clustered based on similarity.

6. The method of claim 1, wherein the retrieving the one or more nodes comprises:

retrieving, from the indexing tree, one or more summaries from the third level based on similarity comparison of the one or more summaries and the query embedding;

iteratively selecting, for each summary, one or more child nodes of the respective summary on the indexing tree based on similarity comparison of the respective child nodes and the query embedding;

traversing the index tree from a top level to lower levels until the second level of proposition aggregates; and concatenating all retrieved nodes to form the context.

7. The method of claim 1, wherein the retrieving the one or more nodes comprises:

retrieving, from a set of all summaries and proposition aggregates in the indexing tree, one or more summaries and/or proposition aggregates subject to a threshold number of tokens based on a similarity comparison between the set of all summaries and proposition aggregates, and an embedding of the user query, respectively, wherein the set of all summaries and proposition aggregates in the indexing tree is obtained by flattening the indexing tree into a single layer.

8. A system for retrieval-augmented text generation to generate a response to a user query by an artificial intelligence (AI) agent, the system comprising:

a memory that stores one or more neural network based language models and a plurality of processor executable instructions;

a communication interface that receives the user query; and one or more hardware processors that read and execute the plurality of processor-executable instructions from the memory to perform operations comprising:

constructing, by one or more neural network based language models, an indexing tree reflecting sematic relationship among textual contexts of one or more documents, wherein the indexing tree comprises at least a first level of nodes representing a plurality of propositions indicating facts about at least one entity from the one or more documents, a second level of nodes representing a plurality of proposition aggregates that aggregate one or more first-level propositions mentioning a same entity, and a third level of nodes representing a plurality of summaries that summarize one or more second-level proposition aggregates;

receiving, via a communication interface, the user query;

retrieving, from the indexing tree, one or more nodes across multiple levels based on similarity comparison with the user query based at least on a similarity between embeddings of the one or more nodes and an embedding of the user query;

generating, by the neural network based language model, a response in response to the user query based on a context combining at least summaries and/or proposition aggregates corresponding to the retrieved one or more nodes; and causing the response to be displayed at a visualized user interface of the AI agent.

9. The system of claim 8, wherein the constructing the indexing tree comprises:

dividing or rewriting the one or more documents into a plurality of segments; and extracting a plurality of entities and the plurality of propositions each relating to one or more entities from the plurality of segments.

10. The system of claim 9, wherein the constructing of the indexing tree further comprises:

determining a first proposition and a second proposition on the first level relate to the same entity;

generating a first proposition aggregate based on the first proposition and the second proposition; and adding a second-level parent node that is linked to two child nodes of the first proposition and the second proposition on the first level.

11. The system of claim 10, wherein the constructing of the indexing tree further comprises:

generating a summary of the one or more second-level proposition aggregates that are clustered based on similarity; and adding a third-level parent node of the summary linking to nodes representing the one or more second-level proposition aggregates.

12. The system of claim 10, wherein the constructing of the indexing tree further comprises:

generating a summary of the one or more second-level proposition aggregates and one or more segments that are clustered based on similarity.

13. The system of claim 8, wherein the retrieving the one or more nodes comprises:

retrieving, from the indexing tree, one or more summaries from the third level based on similarity comparison of the one or more summaries and the query embedding;

iteratively selecting, for each summary, one or more child nodes of the respective summary on the indexing tree based on similarity comparison of the respective child nodes and the query embedding;

traversing the index tree from a top level to lower levels until the second level of proposition aggregates; and concatenating all retrieved nodes to form the context.

14. The system of claim 8, wherein the retrieving the one or more nodes comprises:

retrieving, from a set of all summaries and proposition aggregates in the indexing tree, one or more summaries and/or proposition aggregates subject to a threshold number of tokens based on a similarity comparison between the set of all summaries and proposition aggregates, and an embedding of the user query, respectively, wherein the set of all summaries and proposition aggregates in the indexing tree is obtained by flattening the indexing tree into a single layer.

15. A non-transitory machine-readable medium comprising a plurality of machine-executable instructions which, when executed by one or more processors, are adapted to cause the one or more processors to perform operations comprising:

constructing, by one or more neural network based language models, an indexing tree reflecting sematic relationship among textual contexts of one or more documents, wherein the indexing tree comprises at least a first level of nodes representing a plurality of propositions indicating facts about at least one entity from the one or more documents, a second level of nodes representing a plurality of proposition aggregates that aggregate one or more first-level propositions mentioning a same entity, and a third level of nodes representing a plurality of summaries that summarize one or more second-level proposition aggregates;

receiving, via a communication interface, the user query;

retrieving, from the indexing tree, one or more nodes across multiple levels based on similarity comparison with the user query based at least on a similarity between embeddings of the one or more nodes and an embedding of the user query;

generating, by the neural network based language model, a response in response to the user query based on a context combining at least summaries and/or proposition aggregates corresponding to the retrieved one or more nodes; and causing the response to be displayed at a visualized user interface of the AI agent.

16. The non-transitory machine-readable medium of claim 15, wherein the constructing the indexing tree comprises:

dividing or rewriting the one or more documents into a plurality of segments; and extracting a plurality of entities and the plurality of propositions each relating to one or more entities from the plurality of segments.

17. The non-transitory machine-readable medium of claim 16, wherein the constructing of the indexing tree further comprises:

determining a first proposition and a second proposition on the first level relate to the same entity;

generating a first proposition aggregate based on the first proposition and the second proposition; and adding a second-level parent node that is linked to two child nodes of the first proposition and the second proposition on the first level.

18. The non-transitory machine-readable medium of claim 17, wherein the constructing of the indexing tree further comprises:

generating a summary of the one or more second-level proposition aggregates that are clustered based on similarity; and adding a third-level parent node of the summary linking to nodes representing the one or more second-level proposition aggregates.

19. The non-transitory machine-readable medium of claim 17, wherein the constructing of the indexing tree further comprises:

generating a summary of the one or more second-level proposition aggregates and one or more segments that are clustered based on similarity.

20. The non-transitory machine-readable medium of claim 15, wherein the retrieving the one or more nodes comprises:

retrieving, from the indexing tree, one or more summaries from the third level based on similarity comparison of the one or more summaries and the query embedding;

iteratively selecting, for each summary, one or more child nodes of the respective summary on the indexing tree based on similarity comparison of the respective child nodes and the query embedding;

traversing the index tree from a top level to lower levels until the second level of proposition aggregates; and concatenating all retrieved nodes to form the context.

\* \* \* \* \*